(12) United States Patent
Chen et al.

(10) Patent No.: US 12,547,250 B2
(45) Date of Patent: Feb. 10, 2026

(54) STRAIN GAUGE MULTI-MODE SENSING

(71) Applicant: Apple Inc., Cupertino, CA (US)

(72) Inventors: Denis G. Chen, San Jose, CA (US); Darya Amin-Shahidi, Menlo Park, CA (US); Stephanie Moon, San Francisco, CA (US); Vyom Sharma, Newark, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/742,701

(22) Filed: Jun. 13, 2024

(65) Prior Publication Data

US 2025/0110557 A1 Apr. 3, 2025

Related U.S. Application Data

(60) Provisional application No. 63/541,717, filed on Sep. 29, 2023.

(51) Int. Cl.
| | |
|---|---|
| H04B 3/36 | (2006.01) |
| G06F 3/01 | (2006.01) |
| G06F 3/0362 | (2013.01) |
| H03K 17/96 | (2006.01) |

(52) U.S. Cl.
CPC ............ *G06F 3/016* (2013.01); *G06F 3/0362* (2013.01); *H03K 17/96* (2013.01); *H03K 2217/96062* (2013.01)

(58) Field of Classification Search
CPC ....... G06F 3/016; G06F 3/0362; H03K 17/96; H03K 2217/96062
See application file for complete search history.

(56) References Cited

U.S. PATENT DOCUMENTS

| | | | |
|---|---|---|---|
| 10,025,399 B2 * | 7/2018 | Kim ..................... | G04G 21/08 |
| 10,890,978 B2 * | 1/2021 | Bushnell ................ | G06F 3/016 |
| 11,756,392 B2 * | 9/2023 | Ostdiek ................. | G08B 6/00 |
| | | | 340/407.2 |

* cited by examiner

*Primary Examiner* — Toan N Pham
(74) *Attorney, Agent, or Firm* — Brownstein Hyatt Farber Schreck, LLP

(57) ABSTRACT

A device includes a button, a set of force sensors coupled with the button, a haptic engine coupled to with the button, and control circuitry, where the control circuitry is configured to control operation of the device according to a first mode of operation during a first time duration to detect user force applied to the button via signals from the set of force sensors, and control the device according to a second mode of operation during a second time duration for closed loop control of haptic feedback to the button via the haptic engine and the set of force sensors.

22 Claims, 15 Drawing Sheets

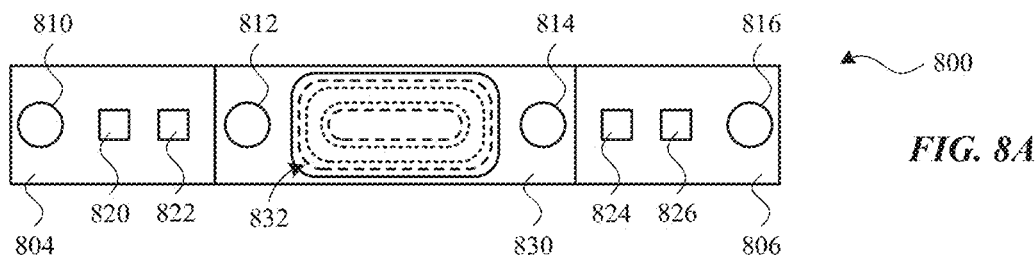
FIG. 8A
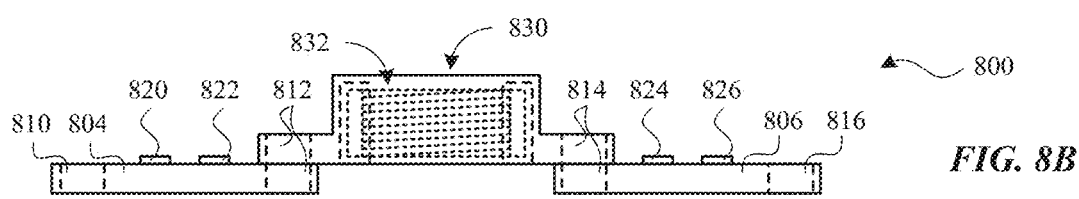
FIG. 8B
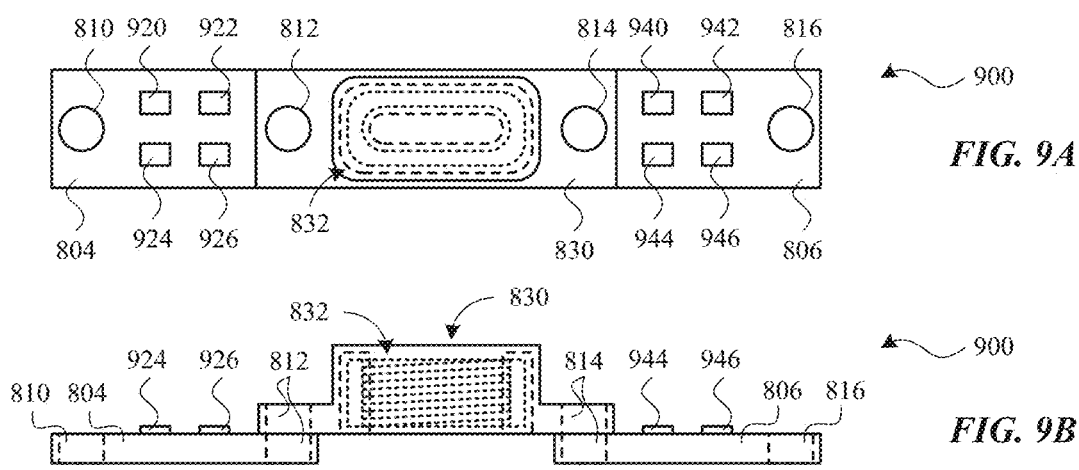
FIG. 9A
FIG. 9B
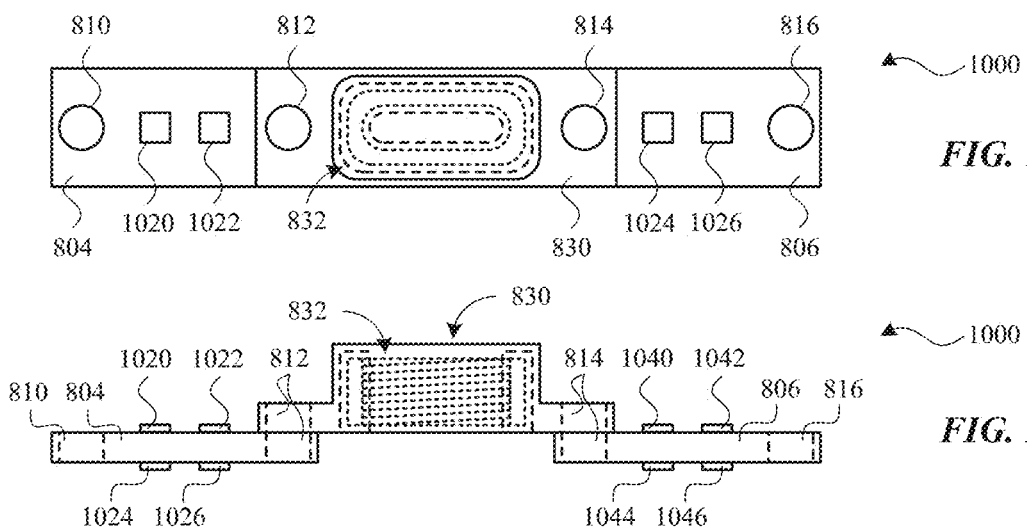
FIG. 10A
FIG. 10B

STRAIN GAUGE MULTI-MODE SENSING

CROSS-REFERENCE TO RELATED APPLICATION(S)

This application is a nonprovisional and claims the benefit under 35 U.S.C. § 1.119 (e) of U.S. Provisional Patent Application No. 63/541,717, filed Sep. 29, 2023, the contents of which are incorporated herein by reference as if fully disclosed herein.

FIELD

The described embodiments generally relate to electronic devices and, more particularly, to electronic devices including a button attached to a haptic engine and force sensors, in which the device may operate in multiple modes to sense a user's press on the button in one mode and both sense and provide haptic feedback via the haptic engine in another mode.

BACKGROUND

Modern consumer electronic devices take many shapes and forms and have numerous uses and functions. Smartphones, wearables devices, including wrist-worn devices (e.g., watches or fitness tracking devices) and head-mounted devices (e.g., headsets, glasses, or earbuds), hand-held devices (e.g., styluses, electronic pencils, or communication or navigation devices), computers (e.g., tablet computers or laptop computers), and dashboards, for example, provide various ways for users to interact with others. Such devices may include numerous systems to facilitate such interactions. For example, a smartphone or computer may include a touch-sensitive display for accepting touch or force inputs and providing a graphical output, and many types of electronic devices may include wireless communications systems (e.g., for connecting with other devices to send and receive voice and data content); one or more cameras (e.g., for capturing photographs and videos); or one or more buttons (e.g., depressible buttons, rocker buttons, or crowns (rotatable buttons) that a user may press or otherwise manipulate to provide input to an electronic device).

SUMMARY

The term embodiment and like terms (e.g., implementation, configuration, aspect, example, and option) are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, the drawings, and each claim.

Some aspects of this disclosure are directed to a device having a button, a set of force sensors coupled with the button, a haptic engine coupled to with the button, and control circuitry, where the control circuitry is configured to control operation of the device according to a first mode of operation during a first time duration to detect user force applied to the button via signals from the set of force sensors, and control the device according to a second mode of operation during a second time duration for closed loop control of haptic feedback to the button via the haptic engine and the set of force sensors.

Some aspects of this disclosure are directed to a device having a button, a haptic engine coupled to the button, a base that includes a frame, a set of flexures, and a set of tabs coupled to the haptic engine. In some aspect, the set of flexures include a set of force sensors disposed thereon, and the set of flexures further include at least a first flexure coupling the frame to a first tab of the set of tabs that is coupled to the haptic engine and a second flexure coupling the frame to a second tab of the set of tabs that is coupled to the haptic engine. The In some aspects the device further has control circuitry electrically coupled with the haptic engine and the set of force sensors to, in a first mode of operation and during a first time duration, detect user force applied to the button via signals from the set of force sensors, and in a second mode of operation for closed loop control of haptic feedback to the button, and during a second time duration, detect user force applied to the button via signals from the set of force sensors, and provide signals to the haptic engine to cause a haptic feedback at the button responsive to the signals from the set of force sensors.

Some aspects of this disclosure are directed to a method of operating a device that includes controlling the device according to a first mode of operation during a first time duration to detect user force applied to a button of the device via signals from a set of force sensors coupled with the button, and controlling the device according to a second mode of operation during a second time duration for closed loop control of haptic feedback to the button via a haptic engine coupled with the button and via the set of force sensors.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the described embodiments, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure will be readily understood by the following detailed description in conjunction with the accompanying drawings, wherein like reference numerals designate like structural elements, and in which:

FIG. 8A shows a top view of an example strain gauge assembly, according to one or more aspects of the present disclosure.

FIG. 8B shows a side view of an example strain gauge assembly, according to one or more aspects of the present disclosure.

FIG. 9A shows a top view of an example strain gauge assembly, according to one or more aspects of the present disclosure.

FIG. 9B shows a side view of an example strain gauge assembly, according to one or more aspects of the present disclosure.

FIG. 10A shows a top view of an example strain gauge assembly, according to one or more aspects of the present disclosure.

FIG. 10B shows a side view of an example strain gauge assembly, according to one or more aspects of the present disclosure.

Figure 1A:
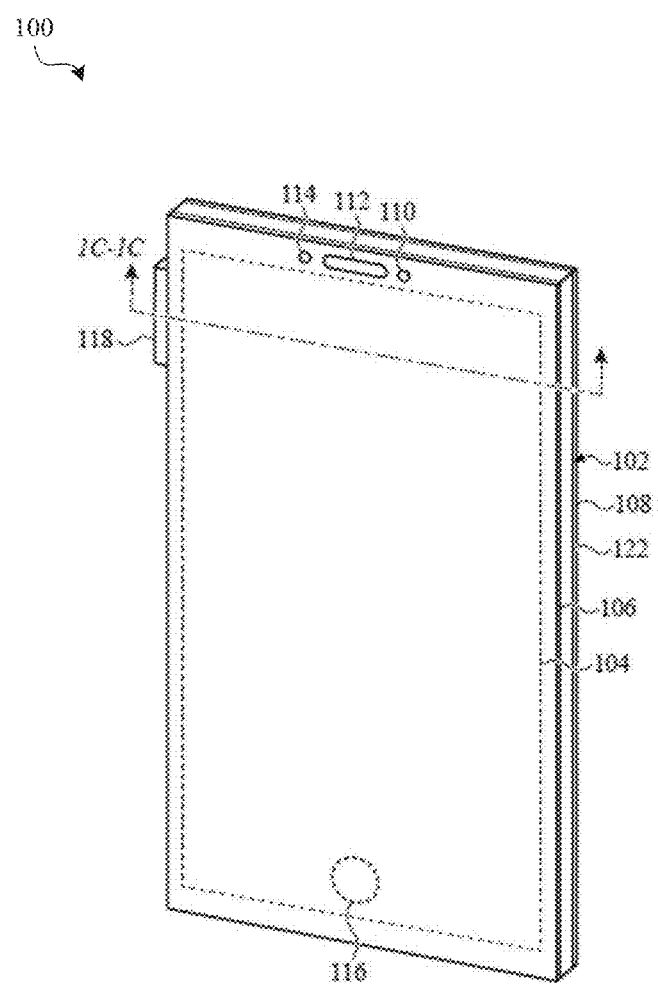
FIGS. 1A-1C show a front isometric view, a rear isometric view, and a side cross-sectional view of an example electronic device having a button and a haptic engine, according to certain aspects of the present disclosure.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

The present disclosure is susceptible to various modifications and alternative forms, and some representative embodiments have been shown by way of example in the drawings and will be described in detail herein. It should be understood, however, that the described embodiments are not intended to be limited to the particular forms disclosed. Rather, the disclosure is to cover all modifications, equivalents, and alternatives falling within the spirit and scope of the described embodiments as defined by the appended claims.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

In some modern consumer electronics devices, a button (e.g., depressible, rocker, crown or other rotatable buttons) can provide both input to the device via force provided by a user, as well as haptic feedback to the user. In some cases, mechanical non-idealities such as friction, stiffness, slack, or aging may affect the performance of the button. For example, such non-idealities may result in a user perceiving delay, non-linearities, false presses, or other unwanted or undesired behavior or sensations. The impact of these non-idealities can be mitigated (e.g., greatly mitigated) by implementing closed-loop control of a button. For example, a button including force sensors and a haptic engine may implement closed-loop control of the haptic engine via signals from the force sensors. As one example design, a fixed bridge (sensor) configuration and analog front-end bandwidth may be used. At least two sensors may be needed to determine both a force (e.g., user force) and location, which may carry a corresponding power and bandwidth penalty (e.g., versus a signal sensor). However, closed-loop control typically requires a high sensing bandwidth, which can result in undesirably high power usage, noise, or both. In some examples, a passive scan requirement may not be met using such closed-loop control. It may not be possible to optimize a design for both closed-loop control and passive scan. As such, improved button designs are needed and desired.

Some of the embodiments described herein are directed to electronic devices having buttons coupled to force sensors and haptic engines. Such buttons coupled to force sensors and haptic engines are at times referred to herein as haptic modules. In some embodiments, a haptic module may include a button, and a set of force sensors and a haptic engine that are coupled with the button. The electronic device may further include control circuitry to operate the haptic module according to multiple modes of operation. In some embodiments, the modes of operation include a first mode of operation that detects a user force applied to the button using the set of force sensors, and a second mode of operation for closed-loop control of the haptic engine to provide feedback to the user based on inputs to the set of force sensors. In one or more embodiments, the first mode of operation can use a lower sampling rate (from the set of force sensors) than the second mode of operation, for example saving power during a first time duration in the first mode of operation while providing a high-resolution feedback to the user during a second time duration, after user interaction is detected, in the second of operation. As such, one or more embodiments relate to a sensor topology and front-end circuit that can switch between a high-speed closed-loop control mode and a low power passive scan mode.

One or more embodiments described herein provide a lower overall power consumption, higher maximum sensing speed, or both (e.g., relative to a single or fixed mode of operation), with a relatively compact sensor layer, without loss of information, or both.

These and other embodiments are discussed below with reference to FIGS. 1A-16. However, those skilled in the art will readily appreciate that the detailed description given herein with respect to these figures is for explanatory purposes only and should not be construed as limiting.

Figure 1B:
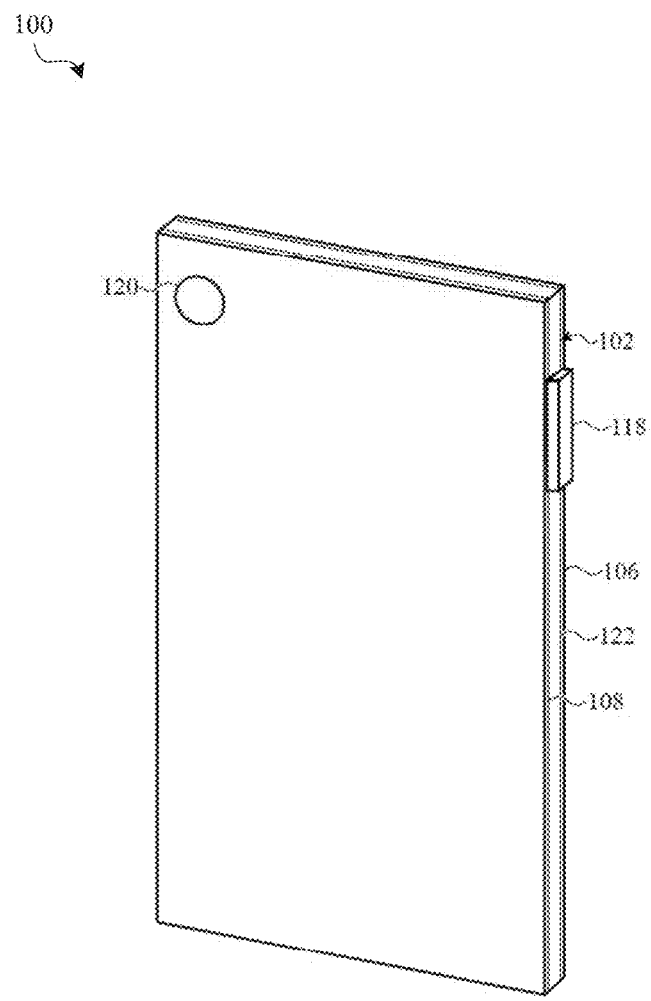
Figure 1C:
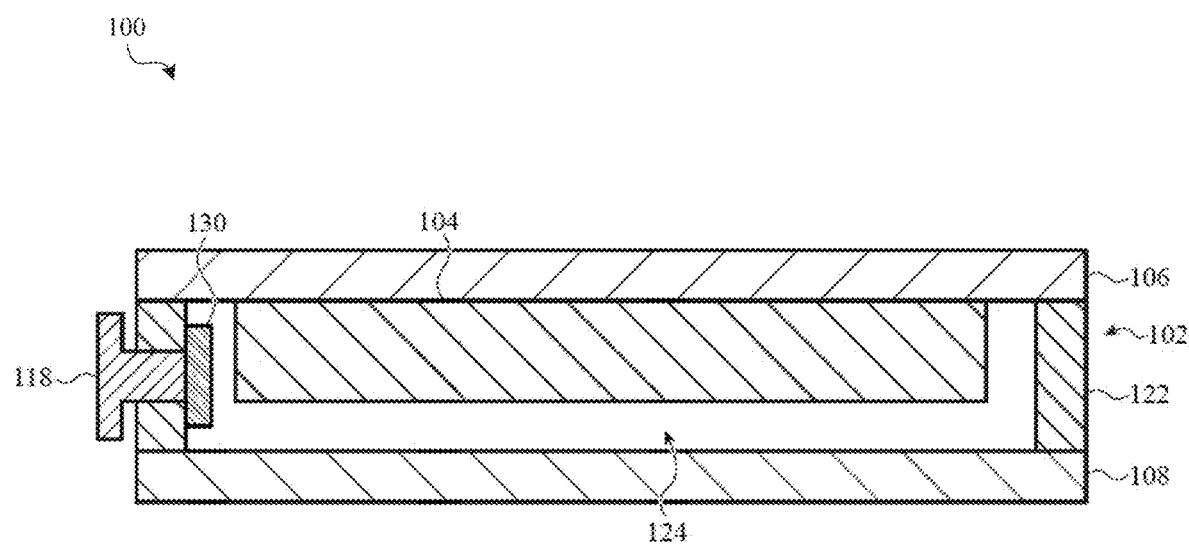

FIGS. 1A-1C show an example of an electronic device or simply "device" 100. The device's dimensions and form factor, including the ratio of the length of its long sides to the length of its short sides, suggest that the device 100 is a mobile phone (e.g., a smartphone). However, the dimensions and form factor of the device are arbitrarily chosen, and the device 100 could alternatively be any portable electronic device including, for example a mobile phone, tablet computer, portable computer, portable music player, health monitor device, portable terminal, or other portable or mobile device. FIG. 1A shows a front isometric view of the device 100; FIG. 1B shows a rear isometric view of the device 100; and FIG. 1C shows an example cross-section of the device 100 taken along 1C-1C of FIG. 1A. The device 100 may include a device housing 102 that at least partially surrounds a display 104. The device housing 102 may include or support a front cover 106 or a rear cover 108. The front cover 106 may be positioned over the display 104 and may provide a window through which the display 104 may be viewed. In some embodiments, the display 104 may be attached to (or abut) the device housing 102 and/or the front cover 106.

As shown in FIGS. 1A and 1B, the device 100 may include various other components. For example, the front of the device 100 may include one or more front-facing cameras 110, speakers 112, microphones, or other components 114 (e.g., audio, imaging, or sensing components) that are configured to transmit or receive signals to/from the device 100. In some cases, a front-facing camera 110, alone or in combination with other sensors, may be configured to operate as a bio-authentication or facial recognition sensor. The device 100 may also include various input devices, including a mechanical or virtual button 116, which may be located along the front surface of the device 100. The device 100 may also include one or more buttons or other input devices (e.g., button 118) positioned along a sidewall 122 of the device housing 102 and/or on rear surface of the device 100. By way of example, the rear surface of the device 100 is shown to include a rear-facing camera 120 or another optical sensor (see, FIG. 1B). A flash or light source may also be positioned along the rear of the device 100 (e.g., near the camera 120). In some cases, the rear surface of the device may include multiple rear-facing cameras.

As discussed previously, the device 100 may include a display 104 that is at least partially surrounded by the device housing 102. The display 104 may include one or more display elements including, for example, light-emitting display (LED), organic light-emitting display (OLED), liquid crystal display (LCD), electroluminescent display (EL), or other type of display elements. The display 104 may also include one or more touch and/or force sensors that are configured to detect a touch and/or a force applied to a surface of the front cover 106. The touch sensor may include a capacitive array of nodes or elements that are configured to detect a location of a touch on the surface of the front cover 106. The force sensor may include a capacitive array and/or strain sensor that is configured to detect an amount of force applied to the surface of the front cover 106.

FIG. 1C depicts a cross-section of the device 100 shown in FIGS. 1A and 1B taken along 1C-1C of FIG. 1A. As shown in FIG. 1C, the rear cover 108 may be a discrete or separate component that is attached to the sidewall 122. In other cases, the rear cover 108 may be integrally formed with part or all of the sidewall 122.

As shown in FIG. 1C, the sidewall 122 or device housing 102 may define an interior volume 124 in which various electronic components of the device 100, including the display 104, may be positioned. In this example, the display 104 is at least partially positioned within the interior volume 124 and attached to an inner surface of the front cover 106. A touch sensor, force sensor, or other sensing element may be integrated with the front cover 106 and/or the display 104 and may be configured to detect a touch and/or force applied to an outer surface of the front cover 106. In some cases, the touch sensor, force sensor, and/or other sensing element may be positioned between the front cover 106 and the display 104, within or in back of a stack including the display 104, between the front cover and the sidewall 122, or at other locations within the device 100.

In some embodiments, the touch sensor and/or force sensor may include an array of electrodes that are configured to detect a location and/or force of a touch using a capacitive, resistive, strain-based, ultrasonic, or other sensing configuration. The touch sensor may include, for example, a set of capacitive touch sensing elements, a set of resistive touch sensing elements, or a set of ultrasonic touch sensing elements. When a user of the device touches the front cover 106, the touch sensor (or touch sensing system) may detect one or more touches on the front cover 106 and determine locations of the touches on the front cover 106. The touches may include, for example, touches by a user's finger or stylus. A force sensor or force sensing system may include, for example, a set of capacitive force sensing elements, a set of resistive force sensing elements, or one or more pressure transducers. When a user of the device 100 presses on the front cover 106 (e.g., applies a force to the front cover 106), the force sensing system may determine an amount of force applied to the front cover 106. In some embodiments, the force sensor (or force sensing system) may be used alone or in combination with the touch sensor (or touch sensing system) to determine a location of an applied force, or an amount of force associated with each touch in a set of multiple contemporaneous touches.

FIG. 1C further shows the button 118 along the sidewall 122. The button 118 may be accessible to a user of the device 100 and extend outward from the sidewall 122. In some cases, a portion of the button 118 may be positioned within a recess in the sidewall 122. Alternatively, the entire button 118 may be positioned within a recess in the sidewall 122 and the button 118 may be flush with the housing (or inset into the housing).

The button 118 may extend through the housing and attach to a haptic engine and force sensor disposed within the interior volume 124; the haptic engine and force sensor are represented in block form by a haptic module 130. Example implementations of button 118 and the haptic module 130 are described in detail elsewhere herein. By way of example, the haptic engine may be an electromagnetic haptic engine. The force sensor may include, for example, a capacitive force sensor, a resistive force sensor (e.g., a strain gauge), a pressure sensor, or a switch (e.g., a compressible switch or a pair of electrical contacts that open or close a circuit when the button 118 is pressed).

The haptic engine of the haptic module 130 may produce a tactile or haptic output in response to the force sensor detecting any force, or in response to the force sensor detecting a force that satisfies a condition. Thus, for example, upon detecting a strain that satisfies a condition (and/or another electrical parameter that is indicative of a force satisfying the condition), the haptic engine may impart a haptic output on the button 118 (e.g., a haptic output resembling a "click", or a haptic output that is more complex). This haptic output may indicate to the user that the user's press was recognized by the device. In some embodiments, a haptic output may also or alternatively be provided in response to a touch being detected on the button 118. In some embodiments, different haptic outputs may be provided, for example, in response to where a user touches or presses the button 118, or in response to how hard or how long the user presses the button 118, or in response to a context of what is displayed on the display 104 and/or an active application, or in response to an ambient condition of the device 100.

Figure 1D:
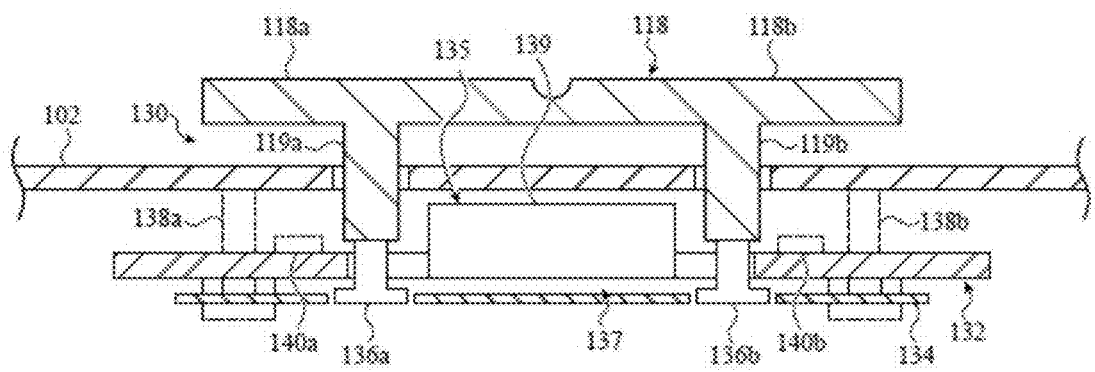
FIG. 1D shows a cross-sectional view of an example button and haptic engine in the electronic device of FIGS. 1A-1C, according to certain aspects of the present disclosure.

FIG. 1D shows a cross-sectional side view of an example configuration of a button, such as the button 118 of the device 100. A user may press the button 118 toward the device housing 102 (e.g., a device housing) to actuate the button 118 and provide an input to the device 100. In some embodiments, the button 118 may have a singular actuation region. In some embodiments, the button 118 may have a singular shaft that extends through an opening in the device housing 102. The button 118, however, is shown to have different actuation regions 118a, 118b. The button 118 is also shown to include multiple shafts (e.g., first and second shafts 119a, 119b) that extend from the button 118 and through respective openings defined by the device housing 102. The shafts 119a, 119b may be coupled to a base 132, interior to the device housing 102, by one or more fasteners 136a, 136b (e.g., screws, rivets, welded or glued plugs or stops, etc.). Although the embodiments described in this disclosure, are directed to a button 118 that includes two actuation regions and two shafts extending through a device housing, it is understood that different buttons may have more or fewer actuation regions, as well as more or fewer shafts extending from the button and through a device housing.

Figure 2:
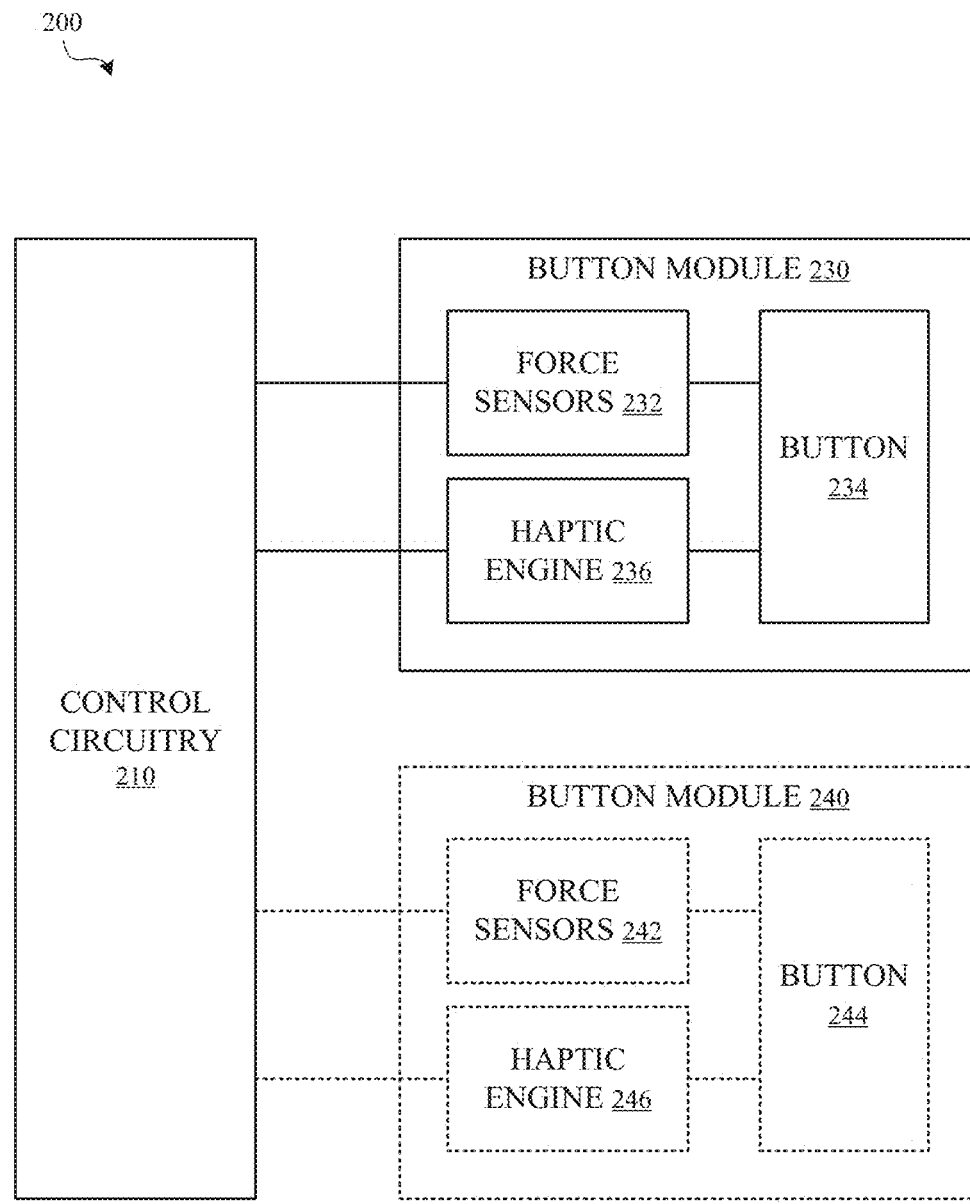
FIG. 2 shows a block diagram of a device, according to one or more aspects of the present disclosure.

The base 132 shown in FIG. 1D is relatively simplistic and includes a plate (or frame) that may be optionally coupled to the device housing 102 by one or more fasteners 138a, 138b (e.g., one or more screws). In some embodiments, the base 132 may be rigidly attached to the device housing 102. In contrast, the fasteners 136a, 136b may fasten the button 118 to the base 132 such that the button 118 can move with respect to the base 132. The movement may be in any direction, including, for example, up and down, side to side, and into and out of the page given the view shown in FIG. 1D. This allowed movement may enable small misalignments between the holes in the base 132 and the holes in the device housing 102. In the case of a button 118 that sits partially or fully within a cavity (e.g., as shown in FIG. 2), the allowed movement may also allow the button to be centered within the cavity. Compressible gaskets (e.g., O-rings) may surround the shafts 119a, 119b and fill any gaps between the shafts 119a, 119b and the device housing 102. A user's press on the button 118 may hold the button 118 in consistent enough contact with the base 132 for a haptic engine 135 to transfer a haptic output to the button 118 via the base 132.

As shown, each shaft 119a, 119b may have an end that faces a first surface of the base 132, and each fastener 136a, 136b may have a head that faces a second surface of the base 132, such that, after the fasteners 136a, 136b are attached to the shafts 119a, 119b, the base 132 is retained between the ends of the shafts 119a, 119b and the heads of the fasteners 136a, 136b. However, when the end of a shaft 119a or 119b abuts the base 132, the head of a corresponding fastener 136a or 136b does not abut the base 132, and vice versa. Similarly, when the head of a fastener 136a or 136b abuts the base 132, the end of a corresponding shaft 119a or 119b does not abut the base 132.

The haptic engine 135 may be attached to the base 132. The haptic engine 135 may include a core 139, an electric coil disposed around at least a portion of the core 139, and an attraction plate 134, as further discussed herein. In FIG. 1D, the core 139 houses the electric coil (not shown).

In some embodiments, the attraction plate 134 may be attached to the base 132 and separated from the core 139 by a gap 137. In other embodiments, the attraction plate 134 may be attached to another component of the device 100 and separated from the core 139 by a gap 137. In other embodiments, the attraction plate 134 may be positioned between the core 139 and the device housing 102 and attached, for example, to the device housing 102 or to the base 132.

The shafts 119a, 119b may be fastened to the base 132 such that forces applied to the button 118 may be transferred to the base 132, and such that a haptic output applied to the base 132 (e.g., due to operation of the haptic engine 135) may be transferred to the button 118.

One or more sensing elements 140a, 140b (e.g., force sensors) coupled to the base 132 may detect deflection of the base 132 as a result of a force applied to the button 118. The sensing elements 140a, 140b may include, for example, strain sensing elements (e.g., strain gauges, piezoelectric and/or piezoresistive materials, etc.) or other components or materials that detect deflection of the base 132 (optionally in conjunction with other circuitry). Each of the sensing elements 140a, 140b may produce a respective electrical signal that varies with the deflection of the base 132. The device 100 may determine, based at least in part on the signal(s) produced by the sensing element(s) 140a, 140b, the presence of a force on the button 118 and, in some cases, a location of a force on the button 118 (e.g., a force applied to actuation region 118a versus a force applied to actuation region 118b). The device 100 may correlate different combinations of signals received from two or more sensing elements 140a, 140b to different locations of an applied force, and may perform different actions or operations based at least in part on the location of an applied force, an amount or duration of the applied force, and/or whether the location or amount or duration of the applied force satisfies one or more conditions for a particular action or operation to be performed.

When the button 118 is pressed, the press causes the base 132 to deflect. The base 132 may be constrained, relative to the device housing 102, such that forces imparted by the button 118 (e.g., forces in a vertical direction relative to the orientation of FIG. 1D) cause the base 132 to be deflected relative to the device housing 102 and/or other components of the device 100. In some cases, one or both ends of the base 132 may be fixed relative to the device housing 102 (and optionally relative to the attraction plate 134). In some cases, one or both ends of the base 132 may be constrained in one direction (e.g., vertical), but movement may be allowed in another direction (e.g., a horizontal direction). One or both ends of the base 132 may be constrained in various ways, such as by the fasteners 138a, 138b that are coupled to the device housing 102.

The base 132 may generally bias the button 118 to an undepressed or unactuated position and may have a stiffness that provides a tactile resistance to an input force (such that the user can tactilely feel that they are pressing against a button that has some compliance while also providing some resistance). The tactile resistance may increase as the base 132 is deflected, such that the user can feel the increasing resistance as the button is pressed.

The haptic engine 135 attached to the base 132 may be activated in response to a press of the button 118 (e.g., when the user presses the button with sufficient force and/or a sufficient distance to cause the device to register an input). When activated, the core 139 of the haptic engine 135 may attract or repulse the attraction plate 134, which is spaced apart from the core 139 by a gap 137. The attraction and/or repulsion deflects the base 132 and moves the button 118 toward or away from the exterior of the device housing 102. In some embodiments, the button 118 may be configured such that the deflection caused by the haptic engine 135 is less than a dimension of the gap 137, such that the base 132 does not contact the attraction plate 134 during its haptic movement.

The haptic engine 135 may initiate the haptic output when the button 118 has moved a particular distance (and/or in response to another input condition being satisfied) and may move the button 118. The movement of the button 118 (e.g., movement of the button 118 away from the user's finger, followed by a subsequent release of the button 118) may be perceived by a user as a button "click," which may provide tactile feedback to the user that an input has been registered. The haptic engine 135 may also cycle between pushing and pulling the button 118 to produce oscillations or other haptic effects.

The haptic engine 135 may be configured to produce haptic outputs in response to various input conditions being satisfied, and the device 100 may perform different operations in response to the different input conditions being satisfied (e.g., different amounts of force and/or deflection thresholds being met, different locations of force, and/or different durations of an applied force). Haptic outputs may also have different durations. The particular duration of a haptic output may depend on various factors, including but not limited to a state or mode of operation of the device (e.g., an application that is being executed, a user interface that is being displayed, etc.), a type of input condition that is satisfied and/or triggers the haptic output, an amount of force applied to the button, a duration of an input, and the like.

FIG. 2 shows a block diagram of a device 200, according to one or more aspects of the present disclosure. Device 200 includes control circuitry 210 and a button module 230 that includes a set of force sensors 232, a button 234, and a haptic engine 236. In some embodiments, button module 230 is an example of or includes at least portions of mechanical or virtual button 116, button 118, or one or more other buttons or input devices of device 100.

In one or more embodiments, control circuitry 210 is configured to control operation of the device 200 according to a first mode of operation during a first time duration to detect user force applied to the button 234 of the button module via signals from the set of force sensors 232. Control circuitry 210 is further configured to control operation of the device 200 according to a second mode of operation during a second time duration for closed loop control of haptic feedback to the button 234 via the haptic engine 236 and the set of force sensors 232.

In one or more embodiments, as also further described herein, the haptic engine 236 includes a core, electric coil, and attraction plate. The device 200 may further include a base for the haptic engine 236, where the base includes tabs extending from the core, flexures extending from the tabs, and a frame to which the flexures are coupled. In one or more embodiments, on a first lateral side of the haptic engine 236, the base has a first tab, and a first flexure coupled with the first tab on one side and coupled with the frame on a second side farther from the haptic engine 236. On a second lateral side of the haptic engine 236, the base has a second tab, and a second flexure coupled with the second tab on one side and coupled with the frame on a second side farther from the haptic engine 236. In some embodiments, the first lateral side of the haptic engine 236 is opposite the second lateral side of the haptic engine 236. In some embodiments, the flexures are a ribbon or planar shape (e.g., thin relative to a length and width of the flexure), each flexure having a first face and a second face. In some embodiments, the attraction plate is welded or otherwise fixedly attached to the frame (e.g., and thereby attached to the base). In other embodiments, the attraction plate is part of or is considered to be part of the base (e.g., by being integral to the base or fixedly attached to the base).

In some embodiments, the first mode of operation uses a first sampling rate and the second mode of operation uses a second sampling rate greater than the first sampling rate.

In some embodiments, the control circuitry 210 is further configured to detect, in the first mode of operation and based at least in part on the signals from the set of force sensors 232, that the user force applied to the button 234 exceeds a threshold value during the first time duration. The control circuitry 210 is further configured to then switch, responsive to the detecting, from controlling the device 200 according to the first mode of operation to controlling the device 200 according to the second mode of operation. In some embodiments, switching to the first mode of operation includes directing power to a control algorithm (e.g., of the control circuitry 210) for the haptic engine 236 and one or more power amplifiers (not shown) for the haptic engine 236.

In some embodiments, the control circuitry 210 is further configured to control the haptic engine 236 to provide a playback of a haptic asset, and switch, responsive to identifying that the playback has concluded, from controlling the device 200 according to the second mode of operation to controlling the device 200 according to the first mode of operation. In some embodiments, the haptic asset is a pattern of signals to drive the haptic engine 236 to provide a desired haptic feedback to the user, and may include information such as amplitude and/or frequency (e.g., as a function of time), duration, location, or other parameters that change how the user experiences the feedback.

In some embodiments, the control circuitry 210 is further configured to identify, from a set of potential states, a state of the button 234 based at least in part on the signals from the set of force sensors 232. In some examples, the set of potential states can include states corresponding to a volume up, the volume down, and undepressed, for example where the set of force sensors 232 includes two or more force sensors (e.g., linearly arranged) that provide sensing for two directions of the button 234. In other examples, the set of potential states can include states corresponding to a volume up, the volume down, a ringer on, the ringer off, and undepressed, for examples where the set of force sensors 232 includes four or more force sensors (e.g., arranged in a square or rectangular arrangement) that provide sensing for additional directions of movement of the button 234.

In one or more embodiments, the set of force sensors 232 include two half bridge sensors, for example a first half bridge sensor and a second half bridge sensor. In some embodiments, the first half bridge sensor and the second half bridge sensor have opposite mechanical polarities under a same bias polarity. In other embodiments, the first half bridge sensor is disposed on a first lateral side of the haptic engine 236 and the second half bridge sensor is disposed on a second lateral side of the haptic engine 236 opposite the first lateral side.

In one or more embodiments, the set of force sensors 232 includes two full bridge sensors. In some embodiments, a first full bridge sensor is disposed on a first lateral side of the haptic engine 236 and a second full bridge sensor is disposed on a second lateral side of the haptic engine 236 opposite the first lateral side. In other embodiments, the first full bridge sensor comprises a first half bridge sensor and a second half bridge sensor disposed on a same face of a first flexure on a first lateral side of the haptic engine, and the second full bridge sensor is two half bridge sensors disposed on a same face of a second flexure on a second lateral side of the haptic engine. In still other embodiments, a first half bridge sensor and a second half bridge sensor of the first full bridge sensor are disposed on opposite faces of a first flexure on a first lateral side of the haptic engine, and a third half bridge sensor and a fourth half bridge sensor of the second full bridge sensor are disposed on opposite faces of a second flexure on a second lateral side of the haptic engine.

Optionally, device 200 may include one or more additional button modules 240 each of which may also include a set of force sensors 242, a button 244, and a haptic engine 246. The one or more additional button modules 240 may be controlled similar to button module 230, as further described herein. In one or more embodiments, control circuitry 210 is further configured to control operation of the device 200 according to the first mode of operation to detect user force applied to the button 244 of the one or more additional button modules in one time duration via signals from the set of force sensors 242. Control circuitry 210 is further configured to control operation of the device 200 according to the second mode of operation during a other time durations for closed loop control of haptic feedback to the button 244 via the haptic engine 246 and the set of force sensors 242.

Figure 3:
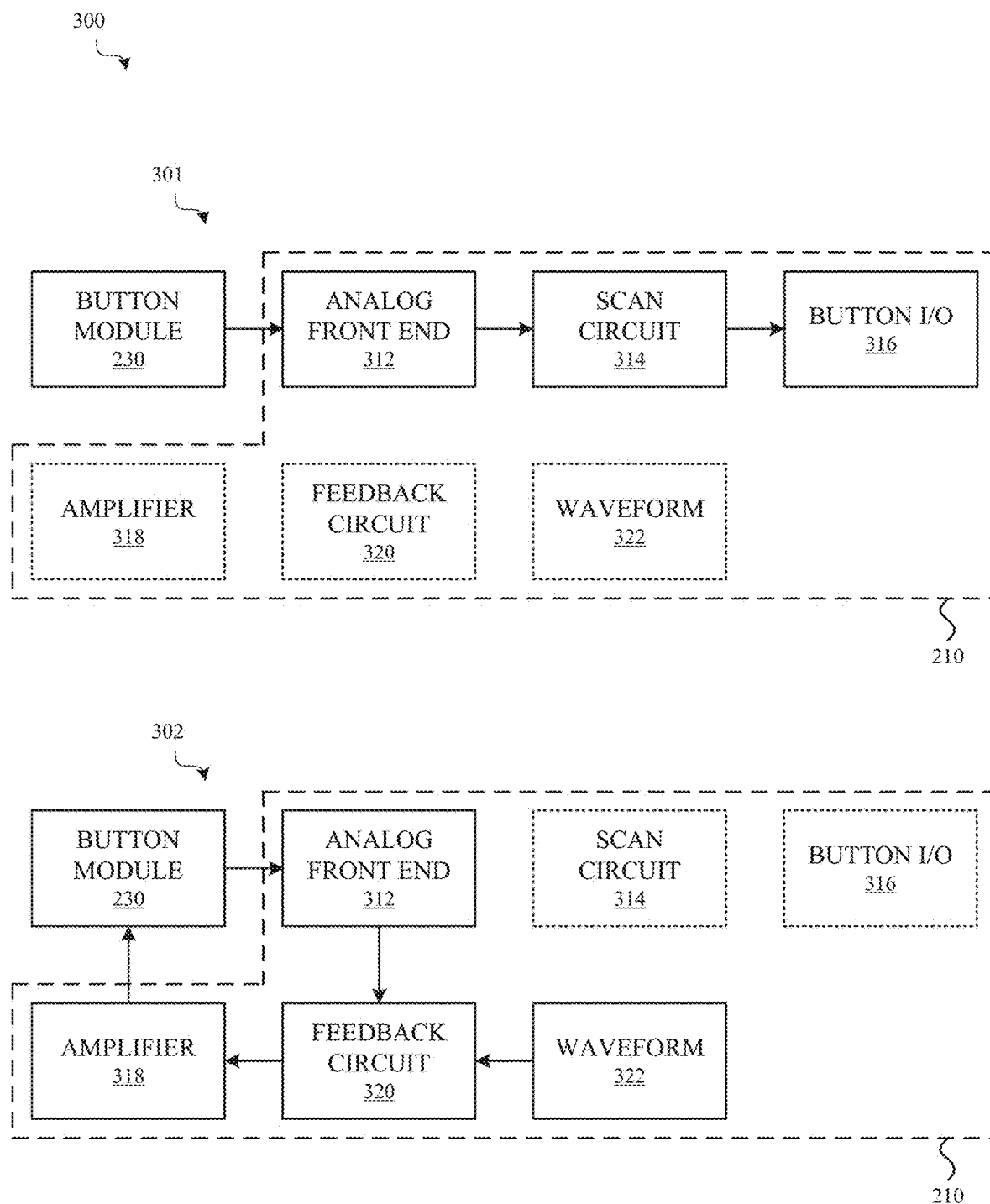
FIG. 3 shows a flow diagrams for strain gauge multi-mode sensing, according to one or more aspects of the present disclosure.

FIG. 3 shows flow diagrams 300 for strain gauge multi-mode sensing, according to one or more aspects of the present disclosure. Flow diagrams 300 include both a flow diagram 301 for a first mode of operation, and a flow diagram 302 for a second mode of operation. Flow diagrams 300 illustrate interactions, including digital and analog signals, that flow to, from, and between components of the button module 230 and components of the control circuitry 210. Components of the button module 230 include the force sensors 232, button 234, and haptic engine 236. Components of the control circuitry 210 include an analog front end 312, scan circuit 314, button input/output 316, amplifier 318, feedback circuit 320, and waveform 322.

According to one or more embodiments described herein (e.g., including user device 100 or device 200), the estimated user force ($P_{est}$) applied to the button 234 of the button module 230 is a sum of a user force at the first force sensor ($P_A$), and force a user force at the second force sensor ($P_B$):

$$P_{est} = P_A + P_B$$

While the user force position is uncontrolled (e.g., the haptic engine is undriven), the engine force position is fixed at module magnetic center.

In one or more embodiments, the button module 230 includes a first force sensor of the set of force sensors 232 (e.g., a first full bridge sensor or a first half bridge sensor) on a first flexure on a first lateral side of the haptic engine 236, and a second force sensor of the set of force sensors 232 (e.g., a second full bridge sensor or a second half bridge sensor) on a second flexure on a second lateral side of the haptic engine 236. In some embodiments, a common mode of operation for the set of force sensors 232 is used for force sensing (e.g., operating the force sensors of the set of force sensors 232 in a common mode), and a differential mode of operation for the set of force sensors 232 is used for position sensing (e.g., operating the force sensors of the set of force sensors 232 in a differential mode). The estimated user force in the common mode can be expressed as follows:

$$P_{est} = \frac{1}{V_{bias}}\left(\frac{V_A - O_A}{S_A} - \frac{V_B - O_B}{S_B}\right)$$

where $V_{bias}$ is the voltage bias applied across the force sensors, $V_A$ is the bridge voltage change for the first force sensor, $O_A$ is the baseline offset for the first force sensor, $S_A$ is the sensitivity for the first force sensor, $V_B$ is the bridge voltage change for the second force sensor, $O_B$ is the baseline offset for the second force sensor, and $S_B$ is the sensitivity for the second force sensor. The estimated user position ($L_{est}$) in the differential mode can be expressed as a ratio between the difference in the user force at the first force sensor and the user force at the second force sensor ($P_A - P_B$) and the total force, which is the sum of the user force at the first force sensor and the user force at the second force sensor ($P_A + P_B$), as follows:

$$L_{est} = X_e\left(\frac{P_A - P_B}{P_A + P_B}\right) + X_o$$

where $X_e$ is a geometry factor, and $X_o$ is a center position geometry offset. The engine force ($P_{eng}$) due to the haptic engine can be expressed as $P_A' + P_B'$, which is a sum of the force at the first force sensor ($P_A'$) and the user force at the second force sensor ($P_B'$) due to the haptic engine. The force at the first force sensor ($P_A'$) due to a voltage bias ($V_{bias}$) applied to the haptic engine can be expressed as follows:

$$P_A' = \frac{V_A' - O_A}{V_{bias} \cdot S_A}$$

The force at the second force sensor ($P_B'$) due to a voltage bias ($V_{bias}$) applied to the haptic engine can be expressed as follows:

$$P'_B = \frac{V'_B - O_A}{V_{bias} \cdot S_B}$$

An engine ratio (Γ) is expressed as the ratio of a difference of the first and second forces to a sum of the first and second forces as follows:

$$\Gamma = \frac{P'_A - P'_B}{P'_A + P'_B}$$

In some embodiments, one or more of $O_A$, $S_A$, $O_B$, $S_B$, $X_e$, $X_o$, or Γ are determined (generated, calculated, or estimated calibration procedure, and are known (e.g., fixed or configured) and used during the first and second modes of operation. In one or more embodiments, sensitivity and geometry calibration are performed to determine $S_A$, $S_B$, $X_e$, and X, for use during the first and second modes of operation, for example for user force. In one or more embodiments, engine ratio calibration is performed to determine Γ for use during the second mode of operation, for example for haptic feedback. In an ideal case for the haptic engine 236, the engine ratio may be zero. However, in some embodiments, due to manufacturing, assembly, or other process imperfections, tolerances, or non-idealities in an analog system, the haptic engine 236 is not perfectly formed and balanced. As such, the engine ratio may be used to compensate for such geometric imperfections and tolerances.

Flow diagram 301 shows a first mode of operation, utilizing the button module 230, the analog front end 312, scan circuit 314, and button input/output 316. In one or more embodiments, flow diagram 301 shows controlling operation of an electronic device described herein (e.g., device 100, device 200, device 600, device 700, or electronic device 1600), according to a first mode of operation during a first time duration to detect user force applied to the button (e.g., button 234 of button module 230) via signals from the set of force sensors (e.g., set of force sensors 232 of button module 230). In one or more embodiments the first mode of operation illustrated by flow diagram 301 may be or utilize a scan mode.

The control circuitry 210 (e.g., via the analog front end 312) may provide a scan signal to the button module 230, and specifically to certain force sensors of the set of force sensors 232 of the button module 230, and the analog front end 312 may sense a signal from the set of force sensors 232. In one or more embodiments, in the first mode of operation, the set of force sensors 232 may be set to a 2×2 half bridge configuration (e.g., as further described herein), and scanned according to a first sampling rate (e.g., 200 Hz), in order to deter a user force applied to the button module 230 (at the button 234). The analog front end 312 determines (generates, calculates) and outputs the estimated user force ($P_{est}$) to the scan circuit 314.

In one or more embodiments, the scan circuit 314 (e.g., which may be or be referred to as an algorithm) determines (e.g., senses, identifies) that the button has been "pushed" or otherwise considered to have been activated or engaged. In one or more embodiments, a "push" has occurred when the estimated user force ($P_{est}$) exceeds a threshold value. In some embodiments, the threshold value is set (fixed, configured) in advance of operating according to the first mode of operation, via code (e.g., firmware or software). The scan circuit 314 provides an indication to the button input/output (button input/output 316) that can provide a signal indicating the "pushed" state to other circuits and systems of a device (e.g., device 100, device 200, device 600, device 700, or electronic device 1600).

In one or more embodiments, the control circuitry 210 (e.g., via the analog front end 312) may provide a scan signal to the button module 230, and specifically to a single force sensor of the set of force sensors 232 of the button module 230, for example, with the set of force sensors 232 configured as a full bridge sensor. In some embodiments, that control circuitry 210 (e.g., via the analog front end 312) can send a scanning signal to the set of force sensors 232 configured as a full bridge sensor in connection with flow diagram 301, which can use less power than the two half bridge sensors (as further described herein), using two scan signals. According to some embodiments, scanning according to a full bridge sensor may be an additional (third) operating mode, where the device transitions to scanning according to the flow diagram 301 using two half bridge sensors as described above in the first operating mode if a "press" or "touch" to the button is sensed in the additional (third) operating mode. Utilizing this third operating mode may reduce power consumption at least in part due to the use of fewer scanning signals.

Flow diagram 302 shows a second mode of operation, utilizing the button module 230, the analog front end 312, feedback circuit 320, amplifier 318, and a waveform 322. In one or more embodiments, flow diagram 302 shows controlling operation of an electronic device described herein (e.g., device 100, device 200, device 600, device 700, or electronic device 1600), according to a second mode during a second time duration for closed loop control of haptic feedback to the button (e.g., button 234 of button module 230) via the haptic engine (e.g., haptic engine 236) and the set of force sensors (e.g., set of force sensors 232 of button module 230). In one or more embodiments the second mode of operation illustrated by flow diagram 302 may be or utilize a haptic mode.

In the second mode of operation, the control circuitry 210 may switch from operating the set of force sensors 232 as one or more half bridges (e.g., two half bridges) to operating the set of force sensors 232 as a full bridge. In the second mode of operation, the set of force sensors 232 may be scanned according to a second sampling rate (e.g., up to 65 kHz) that is higher than the first sampling rate (e.g., 200 Hz), in order to deter a user force applied to the button module 230 (at the button 234) and provide force feedback (haptic feedback) to the user via the button 234. In one or more embodiments, during the second mode of operation, a full-bridge mode sensitivity(S) is used, where(S) is defined as follows:

$$S = \frac{1+\Gamma}{2} \cdot S_A - \frac{1-\Gamma}{2} \cdot S_B$$

The control circuitry 210 (e.g., via the analog front end 312) may provide a scan signal to the button module 230, and specifically to certain force sensors of the set of force sensors 232 of the button module 230, and the analog front end 312 may sense a signal from the set of force sensors 232. In one or more embodiments, the analog front end 312 determines (generates, calculates) and outputs the engine force ($P_{eng}$) to the feedback circuit 320, which in turn provides a signal to the amplifier 318 for the haptic engine 236 to target a particular waveform 322 (e.g., a haptic feedback waveform or pattern). The voltage output ($V_{out}$) of the amplifier 318 is provided to the button module 230, and specifically to the haptic engine 236. The control feedback loop in the second mode of operation can be illustrated as follows:

$$V_{out} \rightleftarrows P_{eng} = \frac{(V'_A - V'_B) - (V_A + O_A - V_B - O_B)}{V_{bias} \cdot S}$$

Where the control loop is between $V_{out}$ and $P_{eng}$, and the intent is generate a feedback force at the button 234 on top of the user force applied to the button 234. Put another way, the term $(V_A'-V_B')$ relates to the force inserted into the system by the haptic engine 236, while the term $(V_A+O_A-V_B-O_B)$ relates to the force applied by the user to the button 234 and thus inserted into the system.

In one or more embodiments, following the performance of the second operation mode during the second time duration (e.g., according to control signals of the control circuitry 210), the device transitions back to the firm mode of operation and performs flow diagram 301. In some embodiments, the device (e.g., control circuitry 210) retains the calculated values for $V_A$, $O_A$, $V_B$, and $O_B$ when switching from the first mode of operation (e.g., the scan mode) to the second mode of operation (e.g., the haptic mode), and retains the calculated values for $V_A'$ and $V_B'$ when switching from the second mode of operation to the first mode of operation. In some embodiments, $V_A$, $O_A$, $V_B$, and $O_B$ are the variables retained in transitioning from a first state (e.g., scanning mode) to a second state (e.g., haptic mode), and $V_A'$ and $V_B'$ are the variables retained in transitioning back to the first state from the second state.

Figure 4:
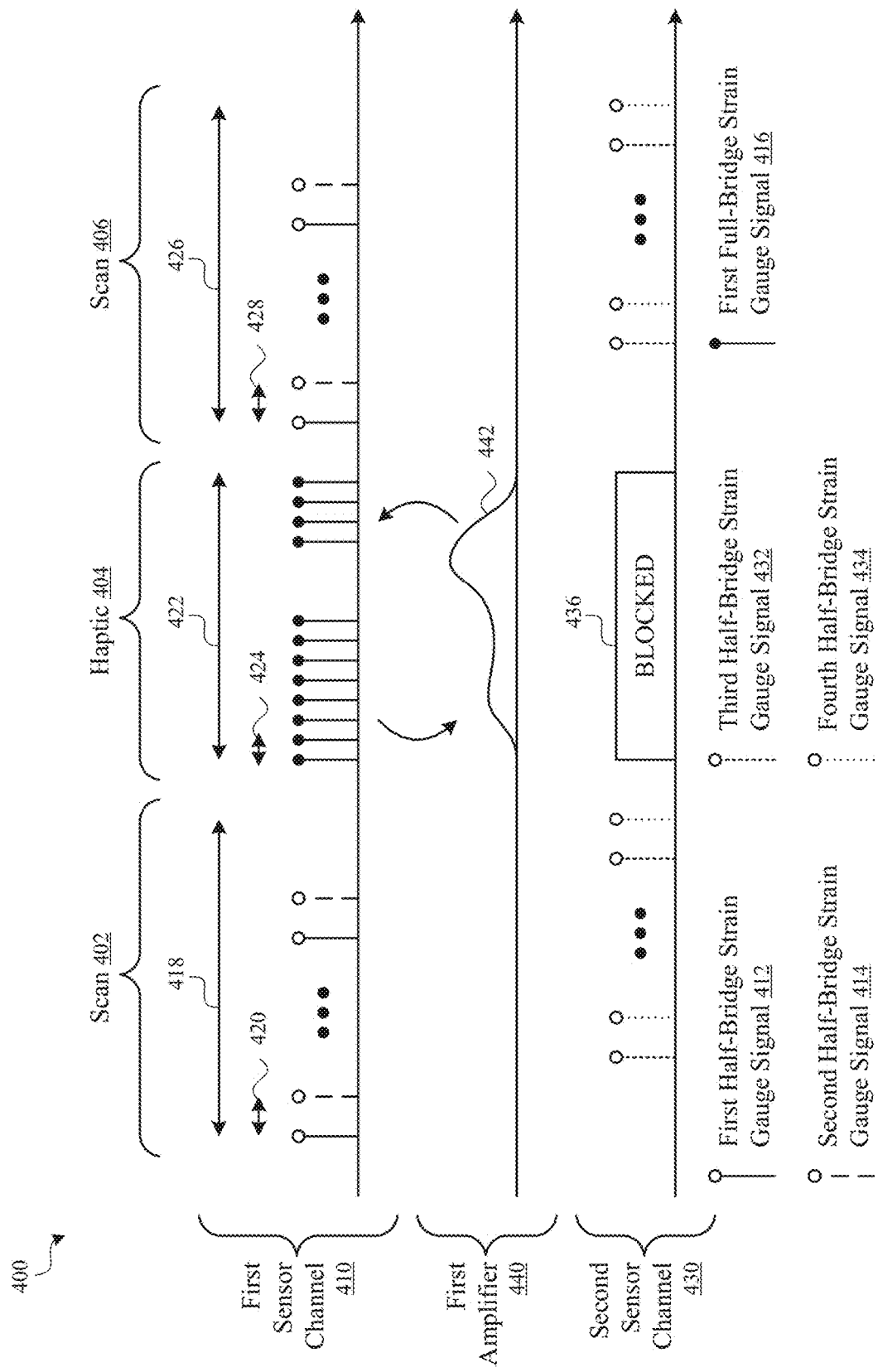
FIG. 4 shows a signaling diagram, according to one or more aspects of the present disclosure.

FIG. 4 shows a signaling diagram 400, according to one or more aspects of the present disclosure. Signaling diagram 400 shows operation in a first mode of operation (e.g., scan mode 402 during a first time duration 418 and scan mode 406 during a third time duration 426), and a second mode of operation (e.g., haptic mode 404 during a second time duration 422). Signaling diagram 400 further shows the signaling at a first sensor channel 410 of the set of force sensors 232, at a second sensor channel 430 of the set of force sensors 232, and at a first amplifier 440 (which may be an example of amplifier 318).

In one or more embodiments, during the first time duration 418 of the scan mode 402, a first half-bridge strain gauge signal 412 is generated with a second half-bridge strain gauge signal 414 for the first sensor channel 410 (e.g., a first sensing channel). Also during the first time duration 418 of the scan mode 402, a third half-bridge strain gauge signal 432 is generated with a fourth half-bridge strain gauge signal 434 for the second sensor channel 430 (e.g., a second sensing channel). In some embodiments, the first half-bridge strain gauge signal 412, the second half-bridge strain gauge signal 414, the third half-bridge strain gauge signal 432, and the fourth half-bridge strain gauge signal 434 alternate during the first time duration 418, for example according to a round-robin or circular pattern. In the scan mode, the first amplifier 440 is off, or otherwise does not amplify an input signal. In some embodiments, the frequency 420 may be about one to two kHz, and the first time duration 418 may be about one to ten milliseconds.

In one or more embodiments, the first half-bridge strain gauge signal 412 is "chopped" with the second half-bridge strain gauge signal 414. Chopping involves reversing the polarity on the sampling, such that the first half-bridge strain gauge signal 412 is a reversed polarity of of the second half-bridge strain gauge signal 414. In some embodiments, such chopping may reduce noise by a factor of the square root of two (e.g., about 1.4), and the sensitivity may not change or remain substantially constant. In a similar way, the third half-bridge strain gauge signal 432 is chopped with the fourth half-bridge strain gauge signal 434.

In one or more embodiments, during the second time duration 422, the mode may switch from the scan mode 402 to the haptic mode 404, and the first half-bridge strain gauge and second half-bridge strain gauge are switched (reconfigured) to a first full-bridge strain gauge configuration. In the haptic mode 404, the sample rate is higher than the scan mode 402. For example, in some embodiments, the frequency 424 may be around 10 to 100 kHz. In some embodiments, the second time duration 422 may be up to about 20 milliseconds in duration. In some embodiments, the second time duration 422 is longer than the first time duration 418. In other embodiments, the second time duration 422 is shorter than the first time duration 418, or about or substantially the same duration.

In some embodiments, the second sensor channel 430 is a half-bridge strain gauge that is reconfigured to be a full-bridge strain gauge together with the first sensor channel 410 for the haptic mode 404. As such, in one or more embodiments, the second sensor channel 430 is blocked at 436, such that the channel is substantially unused. In one or more embodiments chopping is not used during the haptic mode 404.

During the second time duration 422, the first full-bridge strain gauge signal 416 is generated for the first sensor channel 410 (e.g., a first sensing channel). Alternatively, the first full-bridge strain gauge signal 416 is generated for the second sensor channel 430 (e.g., a second sensing channel) and the first sensor channel 410 is blocked. During the haptic mode 404, the user force applied to the button (e.g., button 234) is sensed as further described herein (e.g., with reference to flow diagram 302, and a haptic feedback signal 442 generated and output by first amplifier 440).

Following the second time duration 422, a device may return to the scan mode 406 for a third time duration 426 (e.g., a same length as first time duration 418), and scan with a signal with a frequency 428 (e.g., a same frequency as frequency 420) using both the first sensor channel 410 and the second sensor channel 430.

In one or more embodiments, the control circuitry 210 includes a single analog to digital converter (ADC), for example such that the device (e.g., a chip including control circuitry for a device described herein) utilizes a single ADC for a button accepting user force and providing haptic feedback as described herein. One advantage of the one or more embodiments illustrated by signaling diagram 400 is that a chip area for the control circuitry 210 may be reduced by decreasing or otherwise limiting the number of ADCs to one. Additionally, in one or more embodiments, a decimation ratio for the ADC may be used, lowering power usage, for example a decimation ratio of greater than about ten during the haptic mode 404, and greater than about 40 during scan mode 402 and scan mode 406.

Figure 5:
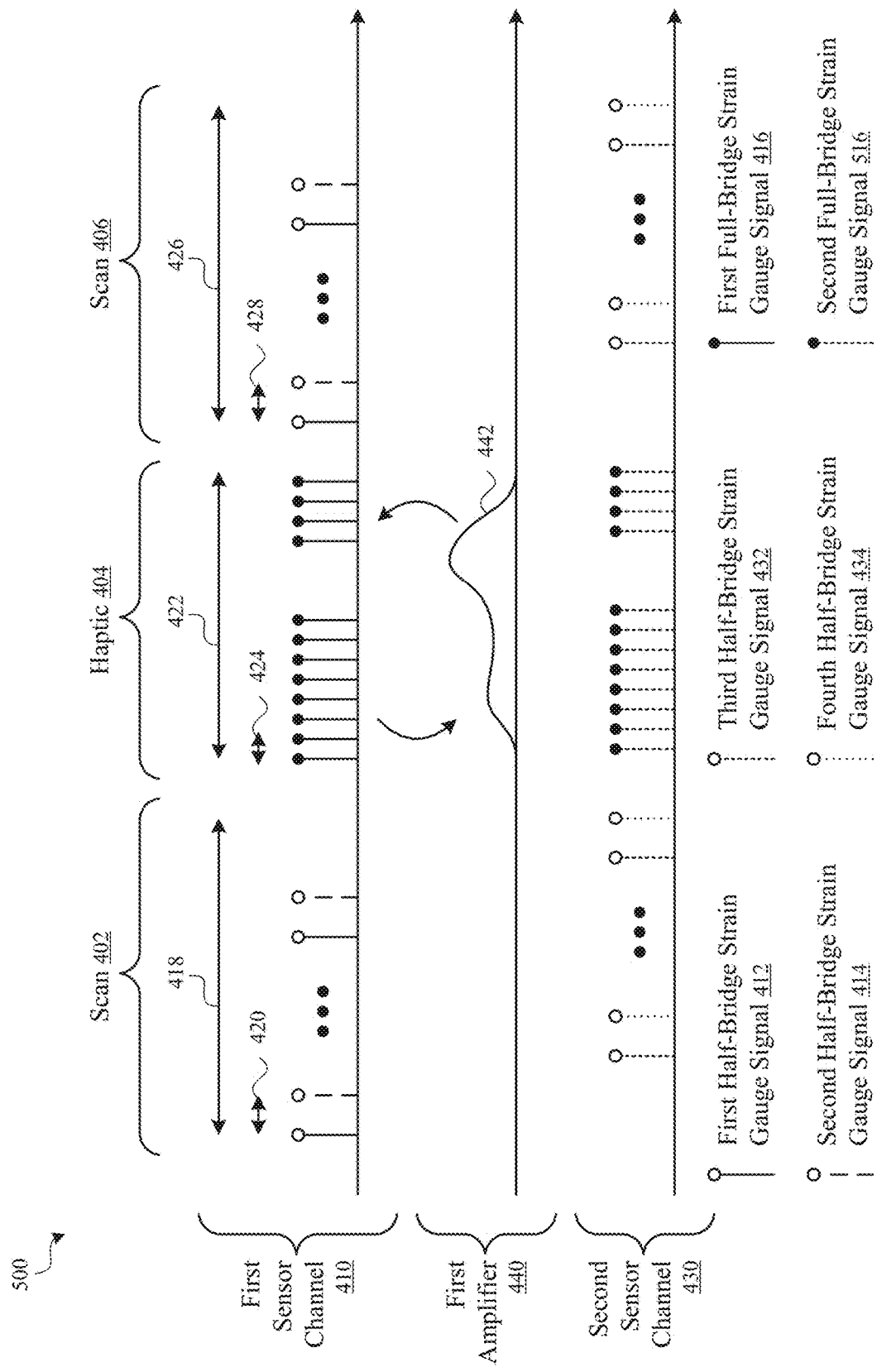
FIG. 5 shows a signaling diagram, according to one or more aspects of the present disclosure.

FIG. 5 shows a signaling diagram 500, according to one or more aspects of the present disclosure. Features of signaling diagram 500 that are the same as or substantially the same as corresponding features of signaling diagram 400 are omitted from description here for brevity and clarity.

Signaling diagram 500 shows a second mode of operation (e.g., haptic mode 404 during a second time duration 422) where the mode may switch from the scan mode 402 to the haptic mode 404, and the first half-bridge strain gauge and second half-bridge strain gauge are switched (reconfigured) to a first full-bridge strain gauge configuration, and the third half-bridge strain gauge and fourth half-bridge strain gauge are switched (reconfigured) to a second full-bridge strain gauge configuration. Similar to signaling diagram 400, in the haptic mode 404, the sample rate is higher than the scan mode 402. However, during the second time duration 422, the first full-bridge strain gauge signal 416 is generated for the first sensor channel 410 (e.g., a first sensing channel), and an additional, second full-bridge strain gauge signal 516 is generated for the second sensor channel 430 (e.g., a second sensing channel). During the haptic mode 404, the user force applied to the button (e.g., button 234) is sensed as further described herein (e.g., with reference to flow diagram 302, based on both of the first full-bridge strain gauge signal 416 as well as the second full-bridge strain gauge signal 516. The haptic feedback signal 442 generated and output by first amplifier 440 based on both of the first full-bridge strain gauge signal 416 and the second full-bridge strain gauge signal 516.

Figure 6:
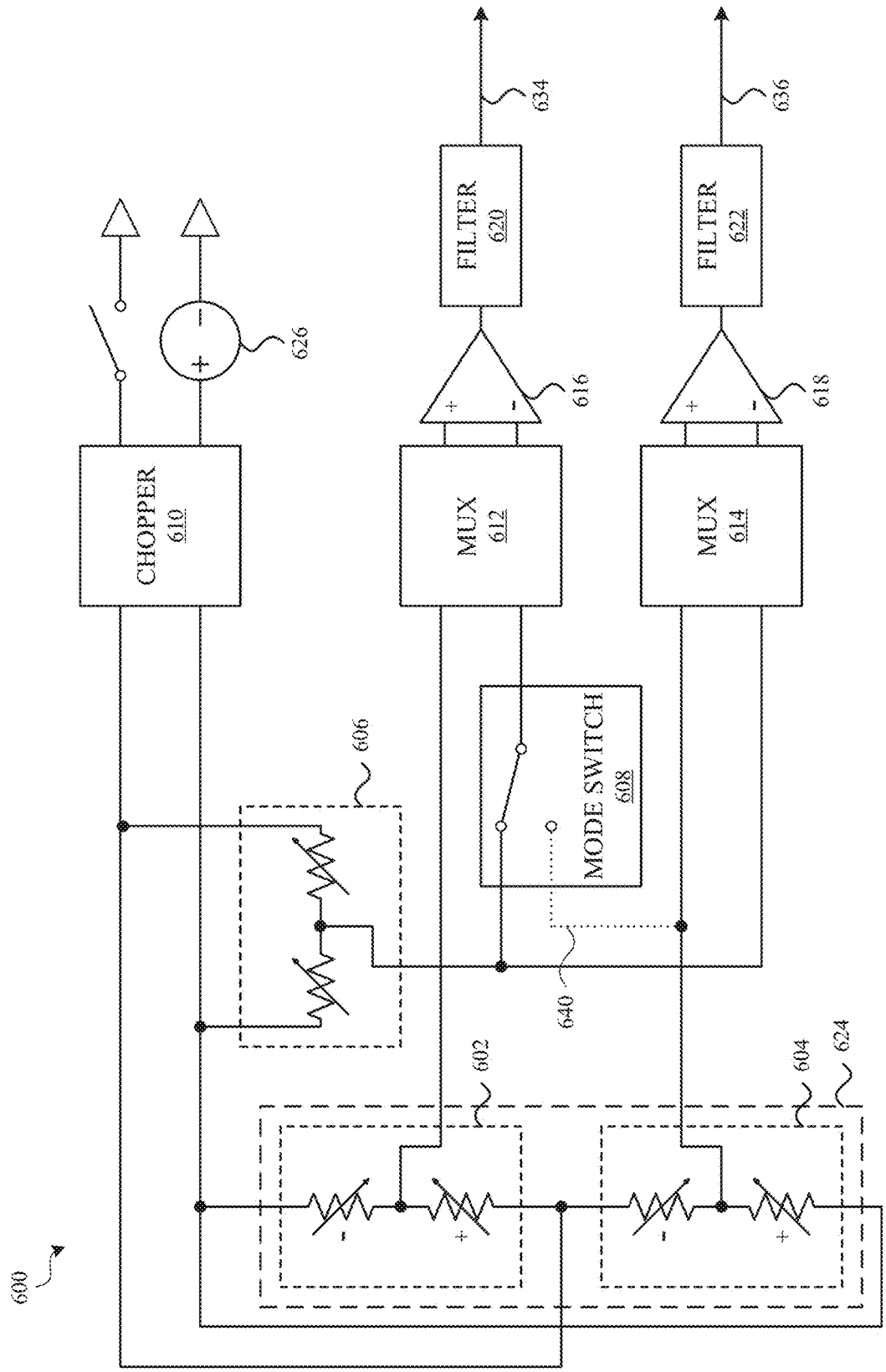
FIG. 6 shows an example electrical block diagram of an electronic device, according to one or more aspects of the present disclosure.

FIG. 6 shows an example electrical block diagram of a device 600, according to one or more aspects of the present disclosure. Device 600 include a set of force sensors 624, a reference voltage source 606, mode switch 608, chopper 610, mux 612, mux 614, operational amplifier 616, operational amplifier 618, filter 620, filter 622, and voltage source 626 (e.g., a direct current (DC) voltage source). In one or more embodiments, one or more components of device 600 are a part of control circuitry 210.

Device 600 shows a setting of the mode switch 608 to operate the device 600 in a first mode of operation (e.g., a scan mode, which is further discussed herein). In the first mode of operation, the mode switch 608 is set to disconnect signal path 640 from mux 612 (and instead connect the reference voltage source 606 to the mux 612).

In one or more embodiments, the set of force sensors 624 may be an example of, include at least portions of, or be a portion of the set of force sensors 232. The set of force sensors 624 include a first force sensor 602 and a second force sensor 604. First force sensor 602 includes a pair of strain gauges and second force sensor 604 includes a second pair of strain gauges.

The pair of strain gauges of the first force sensor 602 are configured as a half-bridge and paired with a reference voltage source 606. The respective voltages of the first force sensor 602 and the reference voltage source 606 are provided to the operational amplifier 616 via mux 612 to be provided at the output 634 following filtering via filter 620. In one or more embodiments, filter 620 is a configurable filter. In some embodiments, filter 620 is a configurable bandpass filter.

The pair of strain gauges of the second force sensor 604 are configured as a half-bridge and paired with a reference voltage source 606. The respective voltages of the second force sensor 604 and the reference voltage source 606 are provided to the operational amplifier 618 via mux 614 to be provided at the output 636 following filtering via filter 622. In one or more embodiments, filter 622 is a configurable filter. In some embodiments, filter 622 is a configurable bandpass filter.

In one or more embodiments, the reference voltage source 606 is a part of the control circuitry 210. In other embodiments, the reference voltage source 606 is mounted or otherwise affixed to a flexible substrate on which the set of force sensors 624 are also affixed. The respective voltages of the second force sensor 604 and the reference voltage source 606 are provided to the operational amplifier 618 via mux 614 to be provided at the output 636 following filtering via filter 622. In one or more embodiments, filter 622 is a configurable filter. In some embodiments, filter 622 is a configurable bandpass filter.

In one or more embodiments, chopper 610 is used to reverse the polarity of the voltage signals (e.g., ground or the voltage source 626) applied to the first force sensor 602, the second force sensor 604, or both, as further described herein.

Figure 7:
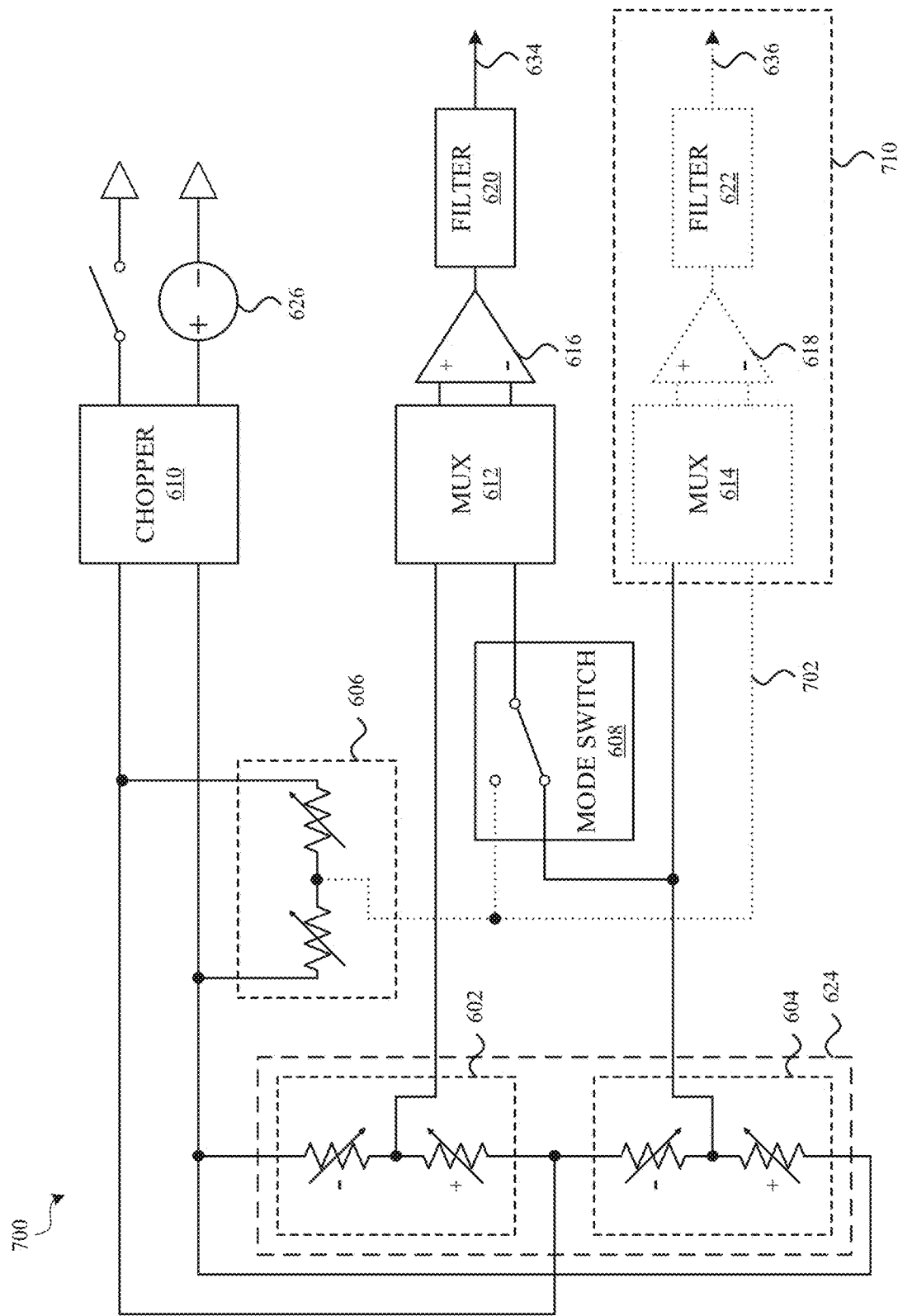
FIG. 7 shows an example electrical block diagram of an electronic device, according to one or more aspects of the present disclosure.
Figure 11A:
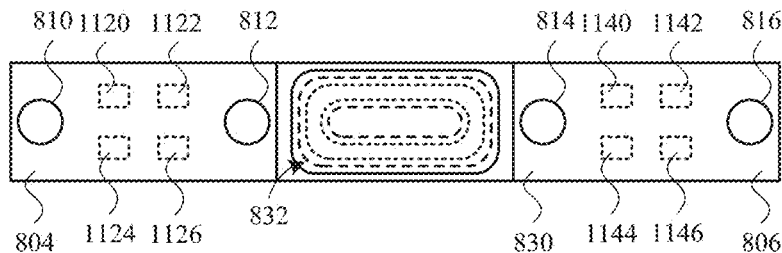
FIG. 11A shows a top view of an example strain gauge assembly, according to one or more aspects of the present disclosure.
Figure 11B:
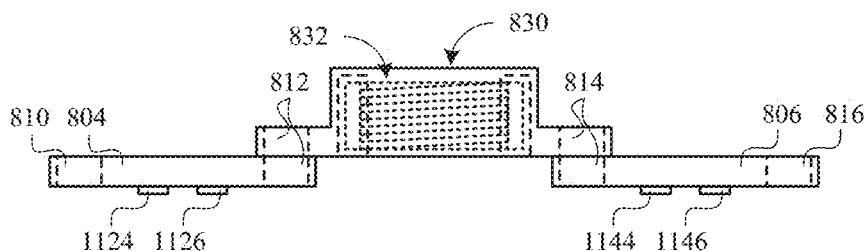
FIG. 11B shows a side view of an example strain gauge assembly, according to one or more aspects of the present disclosure.
Figure 12A:
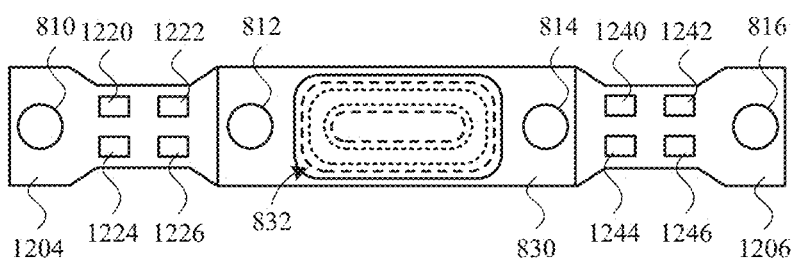
FIG. 12A shows a top view of an example strain gauge assembly, according to one or more aspects of the present disclosure.
Figure 12B:
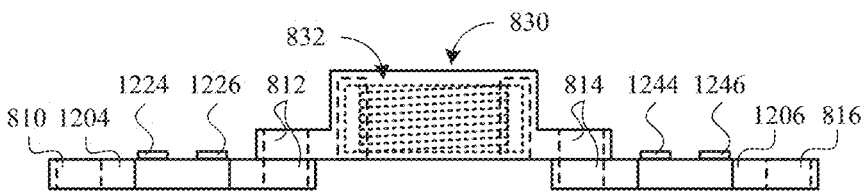
FIG. 12B shows a side view of an example strain gauge assembly, according to one or more aspects of the present disclosure.
Figure 13A:
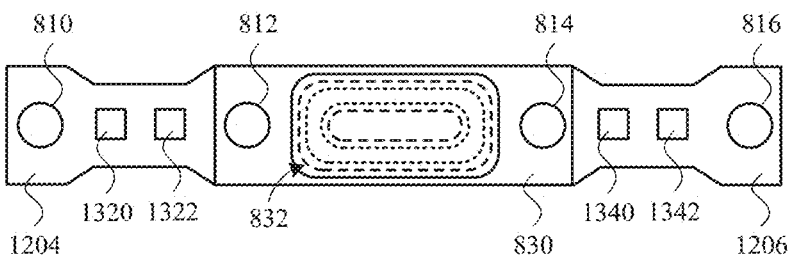
FIG. 13A shows a top view of an example strain gauge assembly, according to one or more aspects of the present disclosure.
Figure 13B:
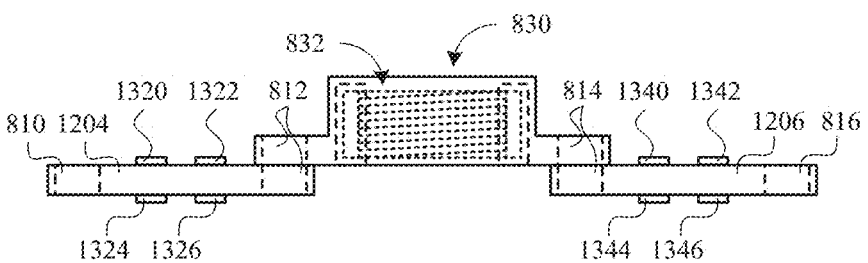
FIG. 13B shows a side view of an example strain gauge assembly, according to one or more aspects of the present disclosure.

FIG. 7 shows an example electrical block diagram of a device 700, according to one or more aspects of the present disclosure. Device 700 include a set of force sensors 624, a reference voltage source 606, mode switch 608, chopper 610, mux 612, mux 614, operational amplifier 616, operational amplifier 618, filter 620, filter 622, and a voltage source 626 (e.g., a direct current (DC) voltage source).

Device 700 shows a setting of the mode switch 608 to operate the device 700 in a second mode of operation (e.g., a haptic mode, which is further discussed herein). In the second mode of operation, the mode switch 608 is set to disconnect signal path 702 from mux 612 (disconnecting the reference voltage source 606 from the mux 612). Instead, the first force sensor 602 and the second force sensor 604 together operate as a full-bridge strain gauge. In one or more embodiments, the set of components 710 that include the mux 614, operational amplifier 618, and filter 622 that provide the output 636 are unused (e.g., OFF, disabled, or powered down) in the second mode of operation.

The pair of strain gauges of the first force sensor 602 and the pair of strain gages of the second force sensor 604 are configured as a full-bridge, and may be biased according to the voltage source 626. In one or more embodiments, chipping using the chopper 610 does not operate during the second mode of operation. A node of a first leg (e.g., a center node between the pair of strain gauges of the first force sensor 602) of the full-bridge is coupled to a first input of the operational amplifier 616 via mux 612. A node of a second leg (e.g., a center node between the pair of strain gauges of the second force sensor 604) of the full-bridge is coupled to a second input of the operational amplifier 616 via mux 612. The output of the operational amplifier 616 is provided at the output 634 following filtering via the filter 620.

FIGS. 8A, 9A, 10A, 11A, 12A, and 13A show top views of example strain gauge assemblies 800, 900, 1000, 1100, 1200, and 1300, respectively, according to one or more aspects of the present disclosure. FIGS. 8B, 9B, 10B, 11B, 12B, and 13B show side views of example strain gauge assemblies 800, 900, 1000, 1100, 1200, and 1300, respectively. In one or more embodiments, the strain gauge assemblies 800, 900, 1000, 1100, 1200, and 1300 are examples of portions of the electronic device described herein (e.g., device 100, device 200, device 600, device 700, or electronic device 1600), and may be or include portions of button module 230 (including force sensors 232 and haptic engine 246) or the set of force sensors 624.

Strain gauge assemblies 800, 900, 1000, 1100, 1200, and 1300 each include a haptic engine portion 830, which may be an example of portions of haptic engine 246. Haptic engine portion 830 also includes a core and electric coil portion 832, which may be examples of a core 139 and electric coil, further described herein. Haptic engine portion 830 further includes aperture 812 and aperture 814. In some embodiments, a first fastener (not shown) may extend through aperture 812 to couple a button (not shown) (e.g., a button 244 of button module 240) to the haptic engine portion 830 and a first flexure 804. A second fasteners (not shown) may extend through aperture 814 to couple the to the haptic engine portion 830 and a second flexure 806.

First flexure 804 is generally coupled to haptic engine portion 830 on a first lateral side of the haptic engine. First flexure 804 has an aperture 810 and the aperture 812. A third fastener (not shown) may extend through aperture 810 to couple the first flexure 804 to a frame (not shown) and/or base (not shown) of the button module (e.g., button module 240). In one or more embodiments, the first flexure 804 supports one or more force sensors of a set of force sensors (e.g., force sensors 140, which may also be referred to as sensing elements herein). In one or more embodiments, the first flexure 804 is a ribbon or planar shape (e.g., thin relative to a length and width of the flexure). A first face of the first flexure 804 is oriented in a same direction as the haptic engine portion 830, and a second face of the first flexure 804 is oriented in an opposite direction as the haptic engine portion 830. Although not shown, one or more layer (e.g., a flexible substrate including multiple insulating or conducting layers) may be interposed between the force sensors of the set of force sensors and the first flexure 804 consistent with the present disclosure, for example as further discussed with reference to the force sensor 1400.

Second flexure 806 is generally coupled to haptic engine portion 830 on a second lateral side of the haptic engine, the second lateral side being opposite the first lateral side of the haptic engine. Second flexure 806 has an aperture 816 and the aperture 814. A fourth fastener (not shown) may extend through aperture 816 to couple the second flexure 806 to the frame and/or the base of the button module. In one or more embodiments, the second flexure 806 supports one or more force sensors of the set of force sensors. In one or more embodiments, the second flexure 806 is a ribbon or planar shape (e.g., thin relative to a length and width of the flexure). A first face of the second flexure 806 is oriented in a same direction as the haptic engine portion 830, and a second face of the second flexure 806 is oriented in an opposite direction as the haptic engine portion 830.

In one or more embodiments, a first constrained layer damper (not shown) may be affixed to the first flexure 804 to absorb acoustic energy. A second constrained layer damper (not shown) may be affixed to the second flexure 806 to absorb acoustic energy. In some embodiments, the first constrained layer damper or second constrained layer damper may be a pressure sensitive adhesive sandwiched between metal layers.

In one or more embodiments, a foam or similar material (not shown) may be attached between the first flexure 804 and the frame to absorb acoustic energy, and a foam or similar material (not shown) may also be attached between the second flexure 806 and the frame to absorb acoustic energy.

In one or more embodiments, a first thermistor (not shown) may be coupled to the first flexure 804, a second thermistor (not shown) may be coupled to the second flexure 806, or both. In some embodiments the thermistor is affixed or otherwise adhered to a same flexible substrate on which one or more of the strain gauges of strain gauge assemblies 800, 900, 1000, 1100, 1200, and/or 1300 are formed. In other embodiments, one more thermistors may be formed on another portion of the strain gauge assembly. The resistance and/or sensitivity to force of force sensors can drift with temperature. For example, thermal drift due to user finger, system heating, or ambient temperature can result in sensing error. A thermistor (e.g., a negative-temperature-coefficient (NTC) thermistor) in proximity to the strain gauge can be added to improve thermal drift and thus reduce sensing error.

Strain gauge assembly 800 includes a set of force sensors that include force sensor 820, force sensor 822, force sensor 824, and force sensor 826. In one or more embodiments, and as shown for strain gauge assembly 800, the set of force sensors are arranged linearly. In one or more embodiments, force sensor 820 and force sensor 822 have opposite mechanical polarities under a same bias polarity, and force sensor 824 and force sensor 826 also have opposite mechanical polarities under a same bias polarity.

In one or more embodiments, force sensor 820 and force sensor 822 are arranged and electrically connected together to form a first half bridge sensor disposed on the first face of the first flexure 804 on a first lateral side of the haptic engine portion 830, and force sensor 824 and force sensor 826 are arranged and electrically connected together to form a second half bridge sensor disposed on a first face of the second flexure 806 on a second lateral side of the haptic engine portion 830. In one or more embodiments, the set of force sensors of the strain gauge assembly 800 are an example of the set of force sensors 624, where force sensor 820 and force sensor 822 are an example of a first force sensor 602, and force sensor 824 are an example of a second force sensor 604.

Strain gauge assembly 900 includes a set of force sensors that include force sensor 920, force sensor 922, force sensor 924, force sensor 926, force sensor 940, force sensor 942, force sensor 944, and force sensor 946. In one or more embodiments, and as shown for strain gauge assembly 900, the set of force sensors are in two groups of four, with force sensor 920, force sensor 922, force sensor 924, and force sensor 926 disposed on the first flexure 804, and force sensor 940, force sensor 942, force sensor 944, and force sensor 946 disposed on the second flexure 806. In one or more embodiments, force sensor 920 and force sensor 922 have a same mechanical polarity that is the opposite of force sensor 924 and force sensor 926 under a same bias polarity, and force sensor 940 and force sensor 942 have a same mechanical polarity that is the opposite of force sensor 944 and force sensor 946 under a same bias polarity.

In one or more embodiments, force sensor 920, force sensor 922, force sensor 924, and force sensor 926 are arranged and electrically connected together to form a first full bridge sensor disposed on a first face of the first flexure 804 on a first lateral side of the haptic engine portion 830, and force sensor 940, force sensor 942, force sensor 944, and force sensor 946 are arranged and electrically connected together to form a second full bridge sensor disposed on a first face of the second flexure 806 on a second lateral side of the haptic engine portion 830. In one or more embodiments, the set of force sensors of the strain gauge assembly 900 are an example of the set of force sensors 232 or the set of force sensors 624.

Strain gauge assembly 1000 includes a set of force sensors that include force sensor 1020, force sensor 1022, force sensor 1024, force sensor 1026, force sensor 1040, force sensor 1042, force sensor 1044, and force sensor 1046. In one or more embodiments, and as shown for strain gauge assembly 1000, the set of force sensors are in two groups of four, with force sensor 1020, force sensor 1022, force sensor 1024, and force sensor 1026 disposed on the first flexure 804, and force sensor 1040, force sensor 1042, force sensor 1044, and force sensor 1046 disposed on the second flexure 806. In one or more embodiments, force sensor 1020 and force sensor 1022 have opposite mechanical polarities under a same bias polarity and are disposed on a first face of the first flexure 804, force sensor 1024 and force sensor 1026 have opposite mechanical polarities under a same bias polarity and are disposed on a second face of the first flexure 804, force sensor 1040 and force sensor 1042 have opposite mechanical polarities under a same bias polarity and are disposed on a first face of the second flexure 806, force sensor 1044 and force sensor 1046 have opposite mechanical polarities under a same bias polarity and are disposed on a second face of the second flexure 806.

In one or more embodiments, force sensor 1020, force sensor 1022, force sensor 1024, and force sensor 1026 are arranged and electrically connected together to form a first full bridge sensor on a first lateral side of the haptic engine portion 830, and force sensor 1040, force sensor 1042, force sensor 1044, and force sensor 1046 are arranged and electrically connected together to form a second full bridge sensor disposed on a second lateral side of the haptic engine portion 830. In one or more embodiments, the set of force sensors of the strain gauge assembly 1000 are an example of the set of force sensors 232 or the set of force sensors 624.

Strain gauge assembly 1100 includes a set of force sensors that include force sensor 1120, force sensor 1122, force sensor 1124, force sensor 1126, force sensor 1140, force sensor 1142, force sensor 1144, and force sensor 1146. Strain gauge assembly 1100 shows an arrangement of force sensors similar in function to the strain gauge assembly 900, except that the set of force sensors are arranged on the second face of first flexure 804 and the second face of the second flexure 806. The arrangement of the set of force sensors as illustrated in strain gauge assembly 1100 may be advantageous to accommodate other components of the button module while providing force sensing and haptic feedback as further described herein.

Strain gauge assembly 1200 includes a set of force sensors that include force sensor 1220, force sensor 1222, force sensor 1224, force sensor 1226, force sensor 1240, force sensor 1242, force sensor 1244, and force sensor 1246. Strain gauge assembly 1200 shows an arrangement of force sensors similar in function to the strain gauge assembly 900, except that force sensor 1220, force sensor 1222, force sensor 1224, and force sensor 1226 are disposed on a first face of a first flexure 1204 having a generally dogbone shape, and force sensor 1240, force sensor 1242, force sensor 1244, and force sensor 1246 are disposed on a first face of a second flexure 1206 having a generally dogbone shape.

As used herein, a "dogbone shape" is where a center portion of the flexure is generally less wide (narrower or skinner, e.g., in the region of the force sensors) than at either of the outer portions of the flexure, for example even where the thickness of the flexure remains of uniform or substantially uniform thickness. In some embodiments, a dogbone shape can reduce stresses near welds. In some embodiments, dogbone shape can better define the sensing service loop length.

Strain gauge assembly 1200 includes a set of force sensors that include force sensor 1220, force sensor 1222, force sensor 1224, force sensor 1226, force sensor 1240, force sensor 1242, force sensor 1244, and force sensor 1246. Strain gauge assembly 1200 shows an arrangement of force sensors similar in function to the strain gauge assembly 900, except that force sensor 1220, force sensor 1222, force sensor 1224, and force sensor 1226 are disposed on a first face of a first flexure 1204 having a generally dogbone shape, and force sensor 1240, force sensor 1242, force sensor 1244, and force sensor 1246 are disposed on a first face of a second flexure 1206 having a generally dogbone shape.

Strain gauge assembly 1300 includes a set of force sensors that include force sensor 1320, force sensor 1322, force sensor 1324, force sensor 1326, force sensor 1340, force sensor 1342, force sensor 1344, and force sensor 1346. Strain gauge assembly 1300 shows an arrangement of force sensors similar in function to the strain gauge assembly 1000, except that force sensor 1320 and force sensor 1322 are disposed on a first face of a first flexure 1304 having a generally dogbone shape, and force sensor 1340 and force sensor 1342 are disposed on a first face of a second flexure 1306 having a generally dogbone shape. Force sensor 1324 and force sensor 1326 are disposed on a second face of the first flexure 1304, and force sensor 1344 and force sensor 1346 are disposed on a second face of a second flexure 1306 having a generally dogbone shape.

In one or more embodiments, one or more of strain gauge assemblies 800, 1000, or 1300 may be used to indicate two inputs (e.g., an up or a down of a volume control) along an axis generally running through the force sensors. For example, with reference to strain gauge assembly 800, a button press may be sensed by a resistance differential between force sensor 820 and force sensor 822, or a resistance differential between force sensor 824 and force sensor 826.

In one or more embodiments, additional inputs may be indicated (e.g., a ringer on or a ringer off, in addition to a volume up or a volume down) using strain gauge assemblies 900, 1100, or 1200. In particular, a first set of inputs (e.g., a button press) may be indicated by a differential between force sensors along a long axis of the strain gauge assembly, and a second set of inputs (e.g., a ringer flip) may be indicated by a differential between force sensors along a short axis of the strain gauge assembly. For example, with reference to strain gauge assembly 900, the first set of inputs (e.g., button press) may be sensed by a resistance differential between a first resistance sum and a second resistance sum, where the first resistance sum is of force sensor 920 and force sensor 924, and the second resistance sum is of force sensor 922 and force sensor 926. The second set of inputs (e.g., ringer flip) may be sensed by a resistance differential between a first resistance differential and a second resistance differential, where the first resistance differential is between the force sensor 920 and force sensor 924, and the second resistance different is between force sensor 922 and force sensor 926. In some embodiments, a connection of the force sensor 920, force sensor 922, force sensor 924, and force sensor 926 are reconfigurable (e.g., using control circuitry 210) to provide a different set of sensed inputs.

Figure 14A:
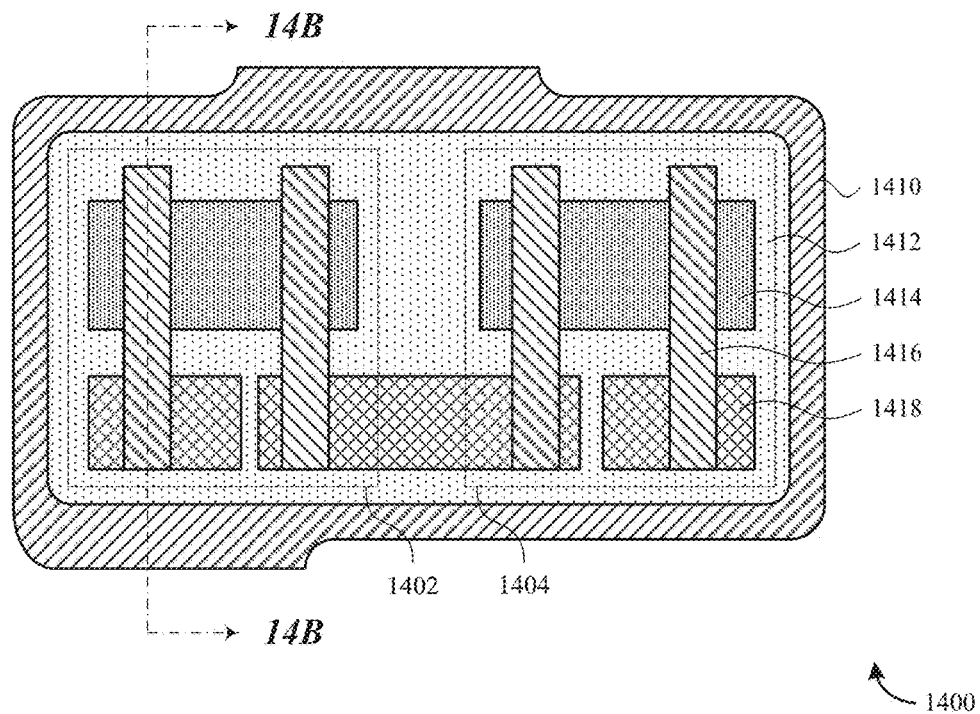
FIG. 14A shows a top view of an example force sensor, according to one or more aspects of the present disclosure.
Figure 14B:
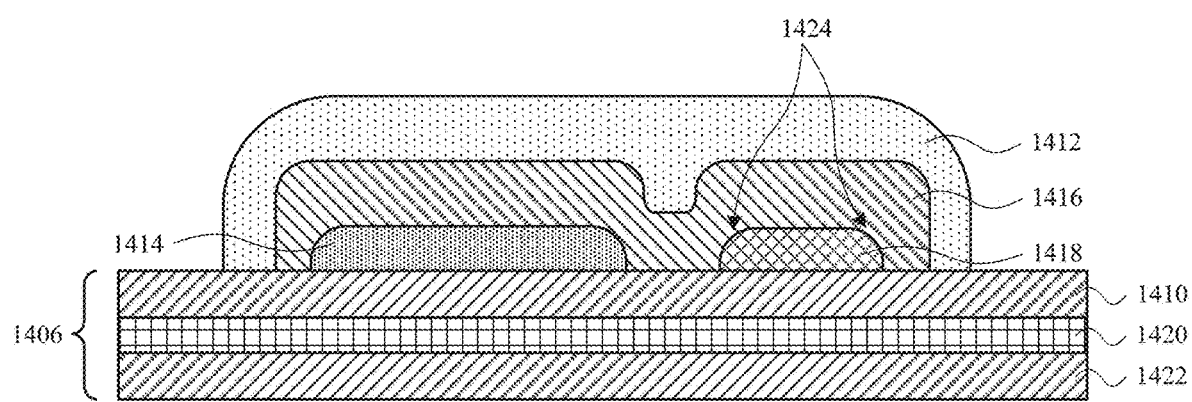
FIG. 14B shows a side cross-sectional view of an example force sensor, according to one or more aspects of the present disclosure.

FIGS. 14A and 14B show a top view and side cross-sectional view, respectively, of an example force sensor 1400, according to one or more aspects of the present disclosure. Force sensor 1400 includes a first strain gauge 1402 and a second strain gauge 1404 (which may collectively be referred to as a pair of strain gauges, a pair of force sensors, or a pair of sensing devices). In one or more embodiments, the force sensor 1400 is an example of a portion of an electronic device described herein (e.g., device 100, device 200, device 600, device 700, or electronic device 1600), and may be or include portions of button module 230 (including force sensors 232), the set of force sensors 624 (e.g., one of first force sensor 602 or second force sensor 604, or a pair of force sensors of one of strain gauge assemblies 800, 900, 1000, 1100, 1200, or 1300, such as any two force sensors on a same face of a same flexure of one of strain gauge assemblies 800, 900, 1000, 1100, 1200, or 1300. Moreover, although a pair (two) strain gauges are shown for force sensor 1400, a similar arrangement can be applied to any number of strain gauges, such as a group of four strain gauges as shown with reference to strain gauge assemblies 900, 1100, or 1200, consistent with the description provided herein.

First strain gauge 1402 and second strain gauge 1404 of force sensor 1400 are formed on a flexible substrate 1406. The flexible substrate 1406 may be fixed to a face of a first flexure 804, second flexure 806, first flexure 1204, or second flexure 1206. In some embodiments, the flexible substrate 1406 may be fixed using glue or another adhesive, such as an adhesive tape. In some embodiments, the adhesive tape may be heat-activated. In some embodiments, the adhesive tape is a dry film epoxy, and may be cured in place during manufacture of the button module that includes the force sensor 1400.

In one or more embodiments, flexible substrate 1406 has a number of flexible layers, including a flexible layer 1410, a flexible layer 1420, and a flexible layer 1422. In one or more embodiments, the flexible layer 1410, the flexible layer 1422, or both, are formed of polyimide (PI). In other embodiments, any other appropriate flexible insulating layer may be used (e.g., polyester (PET)). In one or more embodiments, the flexible layer 1420 includes copper traces and other copper areas. In other embodiments, the flexible layer 1420 may utilize any appropriate conductor.

Force sensor 1400 also includes carbon ink 1414 (e.g., a layer or portion of carbon ink in an area or trace), silver ink 1416 (e.g., a layer or portion of silver ink in an area or trace), and a protective coating 1412. In one or more embodiments, one or more of the carbon ink 1414, the silver ink 1416, or the protective coating 1412 is applied via a printing process. In some embodiments, an appropriate piezoresistive material other than carbon ink 1414 may be used. In some embodiments, an appropriate conductive material other than silver ink 1416 may be used. Any appropriately flexible insulating protective coating may be used consistent with the disclosure herein, to protect the force sensor 1400 from humidity, scratching, or other wear.

Force sensor 1400 includes flexible traces 1418 having rounded corners 1424. In one or more embodiments, the rounded corners 1424 reduce stress and fatigue for force sensor 1400, and may reduce material cracking, fracturing, or other defect formation, and improve the working life of the force sensor 1400. In some embodiments, the rounded corners 1424 may reduce stress concentrations on the carbon ink 1414, silver ink 1416, or both. In some embodiments, the rounded corners 1424 may allow for the printing of thinner layers for the carbon ink 1414, silver ink 1416, or both. In one or more embodiments, the flexible traces 1418 are copper. In other embodiments, the flexible traces 1418 may utilize any appropriate conductor or combination of conductors.

In one or more embodiments, a first instance of force sensor 1400 is formed on a first portion of the flexible substrate 1406, and a second instance of force sensor 1400 is formed on a second portion of the flexible substrate 1406. In some embodiments, the flexible substrate 1406 is folded such that the first instance of the force sensor 1400 is affixed to a first face of a flexure and the second instance of the force sensor 1400 is affixed to a second face of a flexure. In some cases, the folding (e.g., small radius of curvature) of the flexible substrate 1406 between the first instance and the second instance of the force sensor 1400 may introduce a stress concentration that cracks one or more of the flexible layer 1410, the flexible layer 1420, or the flexible layer 1422, which may lead to delamination of the flexible substrate 1406. At least in part to relieve stress on the flexible substrate one or both of the flexible layer 1410 or the flexible layer 1422 is perforated between the first instance and the second instance of the force sensor 1400 (e.g., in the area that is bent or folded to transition from the first face of the flexure to the second face of the flexure. In some embodiments, the perforations may increase stiffness, but beneficially remove stress concentrations.

Figure 15:
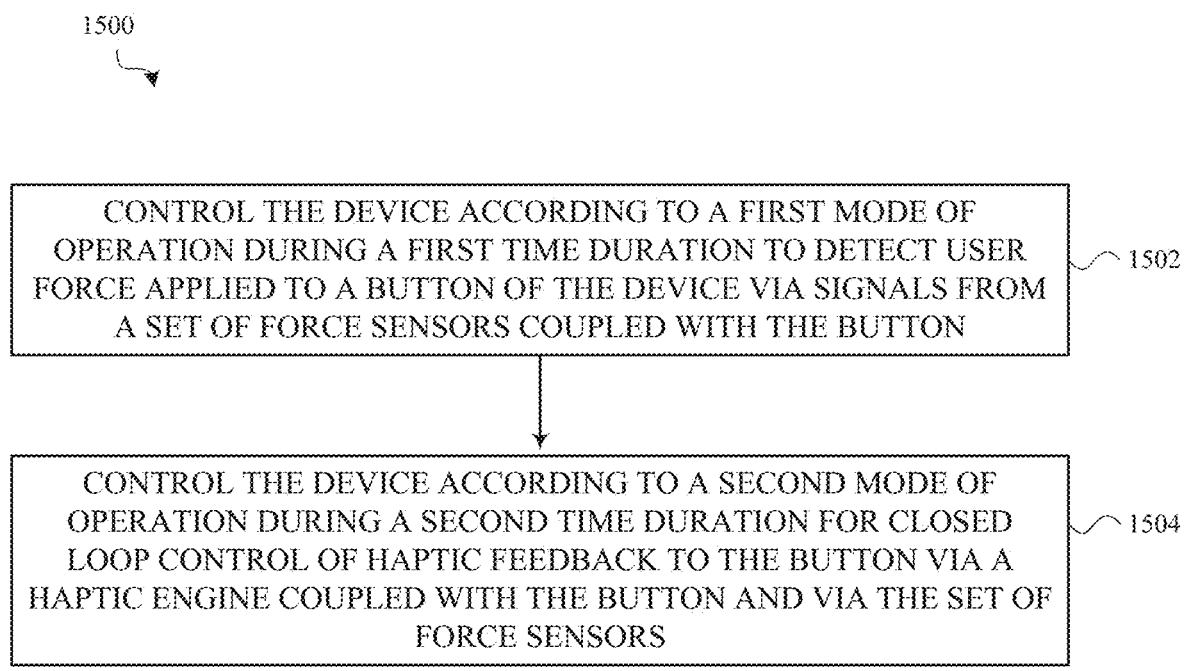
FIG. 15 shows an example method of operating a device, according to one or more aspects of the present disclosure.

FIG. 15 shows an example method 1500 of operating a device, according to one or more aspects of the present disclosure. In one or more embodiments, the device is an example electronic device described herein (e.g., device 100, device 200, device 600, device 700, or electronic device 1600).

At 1502, the method 1500 may include controlling the device according to a first mode of operation during a first time duration to detect user force applied to a button of the device via signals from a set of force sensors coupled with the button.

At 1504, the method 1500 may include controlling the device according to a second mode of operation during a second time duration for closed loop control of haptic feedback to the button via a haptic engine coupled with the button and via the set of force sensors.

In one or more embodiments, the method 1500 may further include detecting, in the first mode of operation and based at least in part on the signals from the set of force sensors, that the user force applied to the button exceeds a threshold value during the first time duration. The method 1500 may then further include switching, responsive to the detecting, from controlling the device according to the first mode of operation to controlling the device according to the second mode of operation.

In one or more embodiments, the method 1500 may further include controlling the haptic engine to provide a playback of a haptic asset, and switching, responsive to identifying that the playback has concluded, from controlling the device according to the second mode of operation to controlling the device according to the first mode of operation (e.g., according to 1502).

Figure 16:
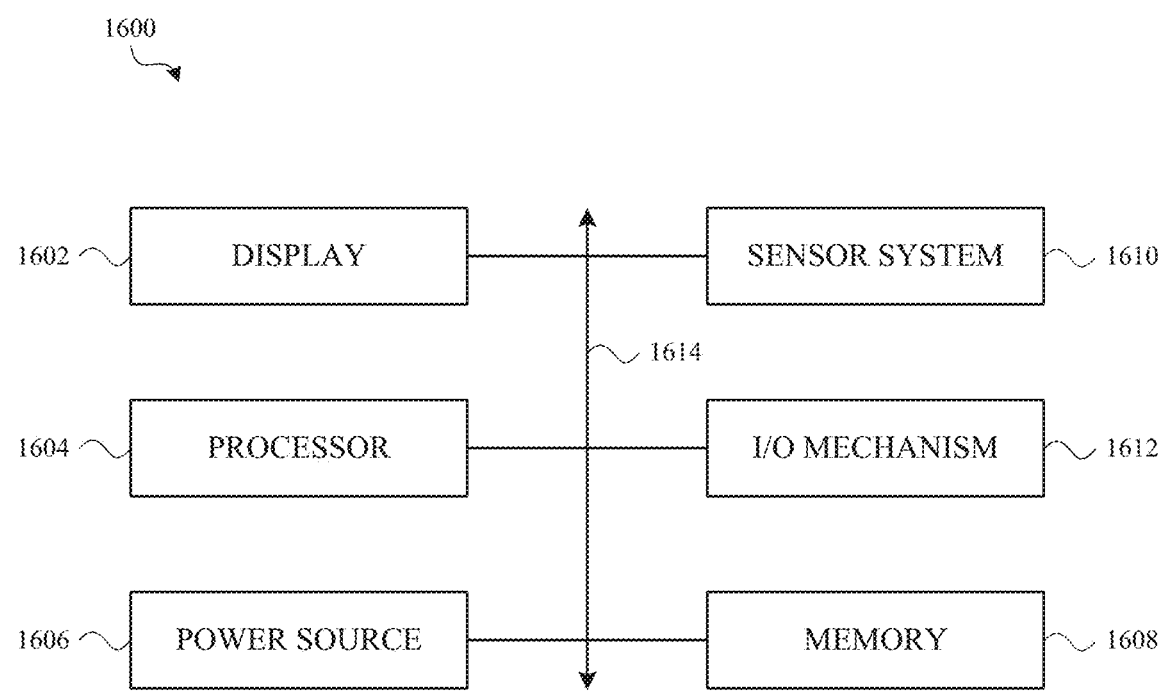
FIG. 16 shows an example electrical block diagram of an electronic device having an example haptic module, according to certain aspects of the present disclosure.

FIG. 16 shows an example electrical block diagram of an electronic device 1600 having a haptic module, such as one of the haptic modules described herein. The electronic device 1600 may take forms such as a hand-held or portable device (e.g., a smartphone, tablet computer, or electronic watch), a navigation system of a vehicle, and so on. The electronic device 1600 may include an optional display 1602 (e.g., a light-emitting display), a processor 1604, a power source 1606, a memory 1608 or storage device, a sensor system 1610, and an optional input/output (I/O) mechanism 1612 (e.g., an input/output device and/or input/output port). The processor 1604 may control some or all of the operations of the electronic device 1600. The processor 1604 may communicate, either directly or indirectly, with substantially all of the components of the electronic device 1600. For example, a system bus or other communication mechanism 1614 may provide communication between the processor 1604, the power source 1606, the memory 1608, the sensor system 1610, and/or the I/O mechanism 1612.

The processor 1604 may be implemented as any electronic device capable of processing, receiving, or transmitting data or instructions. For example, the processor 1604 may be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

In some embodiments, the components of the electronic device 1600 may be controlled by multiple processors. For example, select components of the electronic device 1600 may be controlled by a first processor and other components of the electronic device 1600 may be controlled by a second processor, where the first and second processors may or may not be in communication with each other.

The power source 1606 may be implemented with any device capable of providing energy to the electronic device 1600. For example, the power source 1606 may include one or more disposable or rechargeable batteries. Additionally, or alternatively, the power source 1606 may include a power connector or power cord that connects the electronic device 1600 to another power source, such as a wall outlet, or a wireless charging circuit.

The memory 1608 may store electronic data that may be used by the electronic device 1600. For example, the memory 1608 may store electrical data or content such as, for example, audio and video files, documents and applications, device settings and user preferences, timing signals, control signals, data structures or databases, image data, maps, or focus settings. The memory 1608 may be configured as any type of memory. By way of example only, the memory 1608 may be implemented as random access memory, read-only memory, Flash memory, removable memory, other types of storage elements, or combinations of such devices.

The electronic device 1600 may also include one or more sensors defining the sensor system 1610. The sensors may be positioned substantially anywhere on the electronic device 1600. The sensor(s) may be configured to sense substantially any type of characteristic, such as but not limited to, touch, force, pressure, electromagnetic radiation (e.g., light), heat, movement, relative motion, biometric data, distance, and so on. For example, the sensor system 1610 may include a touch sensor, a force sensor, a heat sensor, a position sensor, a light or optical sensor, an accelerometer, a pressure sensor (e.g., a pressure transducer), a gyroscope, a magnetometer, a health monitoring sensor, an image sensor, and so on. Additionally, the one or more sensors may utilize any suitable sensing technology, including, but not limited to, capacitive, ultrasonic, resistive, optical, ultrasound, piezoelectric, and thermal sensing technology.

The I/O mechanism 1612 may transmit and/or receive data to/from a user or another electronic device. An I/O device may include a display, a touch sensing input surface such as a track pad, one or more buttons (e.g., a graphical user interface "home" button, one of the buttons described herein, or a crown), one or more cameras (including one or more image sensors), one or more microphones or speakers, one or more ports such as a microphone port, and/or a keyboard. Additionally, or alternatively, an I/O device or port may transmit electronic signals via a communications network, such as a wireless and/or wired network connection. Examples of wireless and wired network connections include, but are not limited to, cellular, Wi-Fi, Bluetooth, IR, and Ethernet connections. The I/O mechanism 1612 may also provide feedback (e.g., a haptic output) to a user.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively.

Additionally, directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. These words are intended to relate to the equivalent direction as depicted in a reference illustration; as understood contextually from the object(s) or element(s) being referenced, such as from a commonly used position for the object(s) or element(s); or as otherwise described herein. Further, it is noted that the term "signal" means a waveform (e.g., electrical, optical, magnetic, mechanical, or electromagnetic) capable of traveling through a medium such as DC, AC, sinusoidal-wave, triangular-wave, square-wave, vibration, and the like.

Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

Although the disclosed embodiments have been illustrated and described with respect to one or more implementations, equivalent alterations and modifications will occur or be known to others skilled in the art upon the reading and understanding of this specification and the annexed drawings. In addition, while a particular feature is disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above-described embodiments. Rather, the scope of the disclosure should be defined in accordance with the following claims and their equivalents.

What is claimed is:

1. A device, comprising:
   a button;
   a set of force sensors coupled with the button;
   a haptic engine coupled with the button; and
   control circuitry configured to,
      control operation of the device according to a first mode of operation during a first time duration to detect user force applied to the button via signals from the set of force sensors, and
      control the device according to a second mode of operation during a second time duration for closed loop control of haptic feedback to the button via the haptic engine and the set of force sensors.

2. The device of claim 1, wherein the first mode of operation uses a first sampling rate and the second mode of operation uses a second sampling rate greater than the first sampling rate.

3. The device of claim 1, wherein the control circuitry is further configured to:
   detect, in the first mode of operation and based at least in part on the signals from the set of force sensors, that the user force applied to the button exceeds a threshold value during the first time duration; and
   switch, responsive to the detecting, from controlling the device according to the first mode of operation to controlling the device according to the second mode of operation.

4. The device of claim 3, wherein switching to the first mode of operation comprises:
   directing power to a control algorithm for the haptic engine and one or more power amplifiers for the haptic engine.

5. The device of claim 3, wherein the control circuitry is further configured to:
   control the haptic engine to provide a playback of a haptic asset; and
   switch, responsive to identifying that the playback has concluded, from controlling the device according to the second mode of operation to controlling the device according to the first mode of operation.

6. The device of claim 1, wherein the control circuitry is further configured to:
   identify, from a set of potential states, a state of the button based at least in part on the signals from the set of force sensors, wherein the set of potential states comprises states corresponding to a volume up, a volume down, and undepressed.

7. The device of claim 1, wherein the control circuitry is further configured to: identify, from a set of potential states, a state of the button based at least in part on the signals from the set of force sensors, wherein the set of potential states comprises states corresponding to a volume up, a volume down, a ringer on, a ringer off, and undepressed.

8. The device of claim 1, wherein the set of force sensors comprise a first half bridge sensor and a second half bridge sensor.

9. The device of claim 8, wherein the first half bridge sensor and the second half bridge sensor have opposite mechanical polarities under a same bias polarity.

10. The device of claim 8, wherein the first half bridge sensor is disposed on a first lateral side of the haptic engine and the second half bridge sensor is disposed on a second lateral side of the haptic engine opposite the first lateral side of the haptic engine.

11. The device of claim 1, wherein the set of force sensors comprise a first full bridge sensor and a second full bridge sensor.

12. The device of claim 11, wherein the first full bridge sensor is disposed on a first lateral side of the haptic engine and the second full bridge sensor is disposed on a second lateral side of the haptic engine opposite the first lateral side of the haptic engine.

13. The device of claim 11, wherein:
   the first full bridge sensor comprises a first half bridge sensor and a second half bridge sensor disposed on a same face of a first flexure on a first lateral side of the haptic engine; and
   the second full bridge sensor comprises a third half bridge sensor and a fourth half bridge sensor disposed on a same face of a second flexure on a second lateral side of the haptic engine.

14. The device of claim 11, wherein:
   a first half bridge sensor and a second half bridge sensor of the first full bridge sensor are disposed on opposite faces of a first flexure on a first lateral side of the haptic engine; and
   a third half bridge sensor and a fourth half bridge sensor of the second full bridge sensor are disposed on opposite faces of a second flexure on a second lateral side of the haptic engine.

15. A device, comprising:
   a button;
   a haptic engine coupled to the button;
   a base that includes a frame, a set of flexures, and a set of tabs coupled to the haptic engine, wherein the set of flexures include a set of force sensors disposed thereon, and the set of flexures further include at least a first flexure coupling the frame to a first tab of the set of tabs that is coupled to the haptic engine and a second flexure coupling the frame to a second tab of the set of tabs that is coupled to the haptic engine; and
   control circuitry electrically coupled with the haptic engine and the set of force sensors to,
      in a first mode of operation and during a first time duration, detect user force applied to the button via signals from the set of force sensors, and
      in a second mode of operation for closed loop control of haptic feedback to the button, and during a second time duration, detect user force applied to the button via signals from the set of force sensors, and provide signals to the haptic engine to cause a haptic feedback at the button responsive to the signals from the set of force sensors.

16. The device of claim 15, wherein the set of force sensors comprises a first pair of strain gauges that are disposed on the first flexure on a first lateral side of the haptic engine and a second pair of strain gauges that are disposed on the second flexure on a second lateral side of the haptic engine opposite the first lateral side of the haptic engine.

17. The device of claim 15, wherein the set of force sensors comprises:
a first set of four strain gauges that is disposed on the first flexure on a first lateral side of the haptic engine; and
a second set of four strain gauges that is disposed on the second flexure on a second lateral side of the haptic engine opposite the first lateral side of the haptic engine.

18. The device of claim 17, wherein:
each strain gauge of the first set of four strain gauges are disposed on a same face of the first flexure; and
each strain gauge of the second set of four strain gauges are disposed on a same face of the second flexure.

19. The device of claim 17, wherein:
two strain gauges of the first set of four strain gauges are disposed on a first face of the first flexure, and two strain gauges of the first set of four strain gauges are disposed on a second face of the first flexure; and
two strain gauges of the second set of four strain gauges are disposed on a first face of the second flexure, and two strain gauges of the second set of four strain gauges are disposed on a second face of the second flexure.

20. A method of operating a device, comprising:
controlling the device according to a first mode of operation during a first time duration to detect user force applied to a button of the device via signals from a set of force sensors coupled with the button; and
controlling the device according to a second mode of operation during a second time duration for closed loop control of haptic feedback to the button via a haptic engine coupled with the button and via the set of force sensors.

21. The method of claim 20, further comprising:
detecting, in the first mode of operation and based at least in part on the signals from the set of force sensors, that the user force applied to the button exceeds a threshold value during the first time duration; and
switching, responsive to the detecting, from controlling the device according to the first mode of operation to controlling the device according to the second mode of operation.

22. The method of claim 20, further comprising:
controlling the haptic engine to provide a playback of a haptic asset; and
switching, responsive to identifying that the playback has concluded, from controlling the device according to the second mode of operation to controlling the device according to the first mode of operation.

* * * * *